US012711448B2

(12) United States Patent
Orzechowski et al.

(10) Patent No.: US 12,711,448 B2
(45) Date of Patent: Aug. 18, 2026

(54) SYSTEMS AND METHODS FOR SECURITY OPERATIONS MATURITY ASSESSMENT

(71) Applicant: deepwatch, Inc., Falls Church, VA (US)

(72) Inventors: Patrick Orzechowski, Parker, CO (US); Steven Van Wasshenova, Lakewood, CO (US); Corey Bodzin, Peoria, AZ (US); Greg Genung, The Hills, TX (US); Erik Horton, Aurora, CO (US)

(73) Assignee: Deepwatch, Inc., Falls Church, VA (US)

( * ) Notice: Subject to any disclaimer, the term of this patent is extended or adjusted under 35 U.S.C. 154(b) by 44 days.

(21) Appl. No.: 18/609,584

(22) Filed: Mar. 19, 2024

(65) Prior Publication Data

US 2024/0346424 A1 Oct. 17, 2024

Related U.S. Application Data

(63) Continuation of application No. 18/301,070, filed on Apr. 14, 2023, now Pat. No. 11,966,871, which is a (Continued)

(51) Int. Cl.
*G06Q 10/0639* (2023.01)
*G06F 16/2455* (2019.01)
(Continued)

(52) U.S. Cl.
CPC . *G06Q 10/06393* (2013.01); *G06F 16/24564* (2019.01); *G06F 21/577* (2013.01); (Continued)

(58) Field of Classification Search
CPC ......... G06Q 10/06393; G06Q 10/0635; G06Q 10/06375; G06Q 30/018; G06F 16/24564; G06F 21/577; G06F 2221/034
See application file for complete search history.

(56) References Cited

U.S. PATENT DOCUMENTS 8,196,207 B2 6/2012 Hill
9,294,495 B1 3/2016 Francoeur
(Continued)

FOREIGN PATENT DOCUMENTS

CN 1714327 12/2005
EP 2755139 A1 * 7/2014 .......... G06F 11/3672
WO 2022060968 3/2022

OTHER PUBLICATIONS

"Deepwatch Lens Score: SecOps maturity planning and benchmarking" (Oct. 2020) (https://www.helpnetsecurity.com/2020/10/22/deepwatch-lens-score/) (Year: 2020).*
(Continued)

*Primary Examiner* — Sujay Koneru
(74) *Attorney, Agent, or Firm* — Pillsbury Winthrop Shaw Pittman LLP

(57) ABSTRACT

Systems and methods for assessing, tracking and improving security maturity of an organization are provided. Described is a system for assessing security maturity of an organization. The system receives a list of data sources located across multiple jurisdictions for the organization, collects data sources/data using custom rules from a plurality of data sources of the list of data sources, determine criticality score for each of the plurality of data sources, calculates data source coverage and asset collection coverage, determines use case coverage, and determines security maturity score using a maturity score model. The maturity score model is a logistic equation which is a function of the data source coverage, the asset collection coverage, the criticality score associated with each of the plurality of data sources, the use case coverage, asset coverage by each the plurality of data sources.

18 Claims, 19 Drawing Sheets

Related U.S. Application Data continuation of application No. 17/521,311, filed on Nov. 8, 2021, now Pat. No. 11,631,042, which is a continuation of application No. 17/025,783, filed on Sep. 18, 2020, now Pat. No. 11,170,334.

(51) Int. Cl.

| | |
|---|---|
| ***G06F 21/57*** | (2013.01) |
| ***G06N 20/00*** | (2019.01) |
| ***G06Q 10/0635*** | (2023.01) |
| ***G06Q 10/0637*** | (2023.01) |
| ***G06Q 30/018*** | (2023.01) |
| ***G06Q 50/26*** | (2024.01) |

(52) U.S. Cl.

CPC ......... *G06N 20/00* (2019.01); *G06Q 10/0635* (2013.01); *G06Q 10/06375* (2013.01); *G06Q 30/018* (2013.01); *G06Q 50/26* (2013.01); *G06F 2221/034* (2013.01)

(56) References Cited

U.S. PATENT DOCUMENTS

| | | | |
|---|---|---|---|
| 9,323,428 | B1 | 4/2016 | Maguire |
| 9,930,061 | B2 | 3/2018 | Zandani |
| 10,592,938 | B2 | 3/2020 | Hogg |
| 10,735,910 | B1 | 8/2020 | Dharmar |
| 11,170,334 | B1 | 11/2021 | Orzechowski |
| 11,212,316 | B2 * | 12/2021 | Sweeney ............. H04L 41/0883 |
| 11,244,045 | B2 | 2/2022 | Lunsford |
| 11,631,042 | B2 | 4/2023 | Orzechowski |
| 2001/0049793 | A1 | 12/2001 | Takahiro |
| 2007/0192236 | A1 | 8/2007 | Futch |
| 2008/0167920 | A1 | 7/2008 | Schmidt |
| 2009/0064087 | A1 | 3/2009 | Isom |
| 2010/0114634 | A1 | 5/2010 | Christiansen |
| 2010/0275263 | A1 | 10/2010 | Bennett |
| 2011/0126111 | A1 | 5/2011 | Gill |
| 2011/0252479 | A1 | 10/2011 | Beresnevichiene |
| 2012/0005542 | A1 | 1/2012 | Petersen |
| 2012/0084288 | A1 | 4/2012 | Abdul-Razzak |
| 2012/0084748 | A1 | 4/2012 | Lian |
| 2012/0290379 | A1 | 11/2012 | Hoke |
| 2013/0211983 | A1 | 8/2013 | Lee |
| 2014/0019194 | A1 | 1/2014 | Anne |
| 2014/0297356 | A1 | 10/2014 | Jayade |
| 2015/0302420 | A1 | 10/2015 | Nair |
| 2016/0255105 | A1 | 9/2016 | Palazzo |
| 2016/0359899 | A1 | 12/2016 | Zandani |
| 2017/0132539 | A1 | 5/2017 | Ray |
| 2017/0213037 | A1 | 7/2017 | Toledano |
| 2017/0330197 | A1 | 11/2017 | Dimaggio |
| 2017/0359220 | A1 * | 12/2017 | Weith .................... G06F 16/285 |
| 2018/0018602 | A1 * | 1/2018 | DiMaggio .............. G16H 10/60 |
| 2018/0027006 | A1 | 1/2018 | Zimmermann |
| 2018/0146004 | A1 * | 5/2018 | Belfiore, Jr. .......... G06F 21/577 |
| 2018/0167414 | A1 | 6/2018 | O'Reilly |
| 2018/0246926 | A1 * | 8/2018 | Altaf ..................... G06F 16/215 |
| 2018/0341782 | A1 | 11/2018 | Barday |
| 2019/0052664 | A1 * | 2/2019 | Kibler ................... G06F 11/301 |
| 2019/0073276 | A1 | 3/2019 | Yuen |
| 2019/0132350 | A1 | 5/2019 | Smith |
| 2019/0207968 | A1 | 7/2019 | Heckman |
| 2019/0207981 | A1 | 7/2019 | Sweeney |
| 2019/0213115 | A1 | 7/2019 | Takawale |
| 2019/0222585 | A1 * | 7/2019 | Apple ................... G06F 21/566 |
| 2019/0228161 | A1 | 7/2019 | Grindstaff, II |
| 2019/0238598 | A1 | 8/2019 | Mohamad Abdul |
| 2020/0005406 | A1 | 1/2020 | Scharpf |
| 2020/0135049 | A1 | 4/2020 | Atencio |
| 2020/0167798 | A1 | 5/2020 | Lee |
| 2020/0193022 | A1 | 6/2020 | Lunsford |
| 2020/0225655 | A1 | 7/2020 | Cella |
| 2020/0233955 | A1 * | 7/2020 | Ramzan ................ G06F 21/554 |
| 2020/0279015 | A1 | 9/2020 | Lu |
| 2020/0342374 | A1 | 10/2020 | Conde-Berrocal |
| 2020/0351296 | A1 | 11/2020 | Francoeur |

OTHER PUBLICATIONS

International Search Report mailed on Oct. 5, 2021, for PCT Application No. PCT/US2021/050643, filed on Sep. 16, 2021, 2 pages.

International Preliminary Report on Patentability for International Application No. PCT/U2021/50643 dated Mar. 30, 2023, 5 pages.

SIFMA (Feb. 2018). "Insider Threat Best Practices Guide," 2nd edition, located at https://www.sifma.org/wp-content/uploads/2018/02/insider-threat-best-practices-guide.pdf, 58 total pages.

Written Opinion of the International Searching Authority mailed on Oct. 5, 2021, for PCT Application No. PCT/US2021/050643, filed on Sep. 16, 2021, 3 pages.

Hudson et al. "A Guide To Assessing Security Maturity" (2019)(https://www.vmware.com/contenUdam/digitalmarketing/vmware/en/pdf/docs/vmwcb-report-a-guide-to-assessing-security-maturity.pdf) (Year: 2019).

Extended European Search Report issued in related EP Application No. 21870205.8, dated Sep. 19, 2024.

* cited by examiner

500

| DATA SOURCE | CRITICAITY |
| --- | --- |
| FIREWALL | HIGH |
| ENDPOINT DETECTION & RESPONSE (EDR) | HIGH |
| ANTI-VIRUS (AV) | HIGH |
| WEB SERVER/ WAF DATA | HIGH |
| E-MAIL SECURITY | HIGH |
| WINDOWS DOMAIN CONTROLLERS (OS - WINDOWS) | HIGH |
| MULTI-FACTOR AUTHENTICATION (MFA) | HIGH |
| REMOTE ACCESS | HIGH |
| WEB PROXY | HIGH |
| CLOUD | HIGH |
| CLOUD SECURITY | HIGH |
| WINDOWS MEMBER SERVERS (OS - WINDOWS) | HIGH |
| LINUX SERVER SECURE & AUDITD LOGS (OS – LINUX) | HIGH |
| ACTIVE DIRECTORY INFRASTRUCTURE | HIGH |
| INTRUSION DETECTION SYSTEMS (IDS) & INTRUSION PREVENTION SYSTEMS (IPS) | HIGH |
| PRIVILEGED ACCOUNT MANAGEMENT | HIGH |

| DATA SOURCE | CRITICAITY |
|---|---|
| DNS SERVER | MEDIUM |
| DATA LOSS PREVENTION (DLP) | MEDIUM |
| NETWORK INFRASTRUCTURE | MEDIUM |
| HOST BASED INTRUSION DETECTION SYSTEM (HIDS) | MEDIUM |
| DHCP SERVER | MEDIUM |
| CONFIGURATION MANAGEMENT TOOLS | MEDIUM |
| DATABASE ACCESS & ACTIVITY LOGS | MEDIUM |
| VULNERABILITY MANAGEMENT TOOLS | MEDIUM |
| ASSET & IDENTITY DATA | MEDIUM |
| WORKSTATION OPERATING SYSTEM (OS) LOGS | MEDIUM |
| EMAIL SERVER | MEDIUM |

| DATA SOURCE | CRITICAITY |
|---|---|
| AV - ANOMALOUS INCREASE IN NUMBER OF INFECTIONS | LOW |
| AV - ANOMALOUS INCREASE IN NUMBER OF INFECTED HOSTS | LOW |
| AV - MULTIPLE HOSTS INFECTED WITH THE SAME SIGNATURE | LOW |
| AV - ANOMALOUS INCREASE IN NUMBER OF INFECTIONS | LOW |
| AV - ANOMALOUS INCREASE IN NUMBER OF INFECTED HOSTS | LOW |

Score Breakdown

Collection 3.1

Use Cases 10

We've assumed all use cases are decided for your selected log sources. Partner with us to track active vs inactive use cases Coverage 10

We've assumed 100% coverage for your selected log sources. Partner with us to get your actual coverage.

WHAT INDUSTRIES DOES YOUR COMPANY OPERATE IN ?

WE'LL SHOW YOU HOW YOUR POTENTIAL MATURITY SCORE COMPARES TO YOUR SELECTED NAICS INDUSTRY AVERAGE.

- ☐ ACCOMMODATION AND FOOD SERVICES
- ☐ ADMINISTRATIVE AND SUPPORT AND WASTE MANAGEMENT AND REMEDIATION SERVICES
- ☐ AGRICULTURE, FORESTRY, FISHING AND HUNTING
- ☐ ARTS, ENTERTAINMENT AND RCREATION
- ☐ CONSTRUCTION
- ☐ EDUCATIONAL SERVICES
- ☐ FINANCE AND INSURANCE
- ☐ HEALTH CARE AND SOCIAL ASSISTANCE
- ☐ INFORMATION
- ☐ MANAGEMENT OF COMPANIES AND ENTERPRISES
- ☐ MANUFACTURING
- ☐ MINING
- ☐ OTHER SERVICES (EXCEPT PUBLIC ADMINISTRATION)
- ☐ PROFESSIONAL, SCIENTIFIC, AND TECHNICAL SERVICES
- ☐ PUBLIC ADMINISTRATION
- ☐ REAL ESTATE RENTAL AND LEASING
- ☐ RETAIL TRADE
- ☐ TRANSPORTATION AND WAREHOUSING
- ☐ UTILITIES
- ☐ WHOLESALE TRADE

SEE POTENTIAL MATURITY SCORE

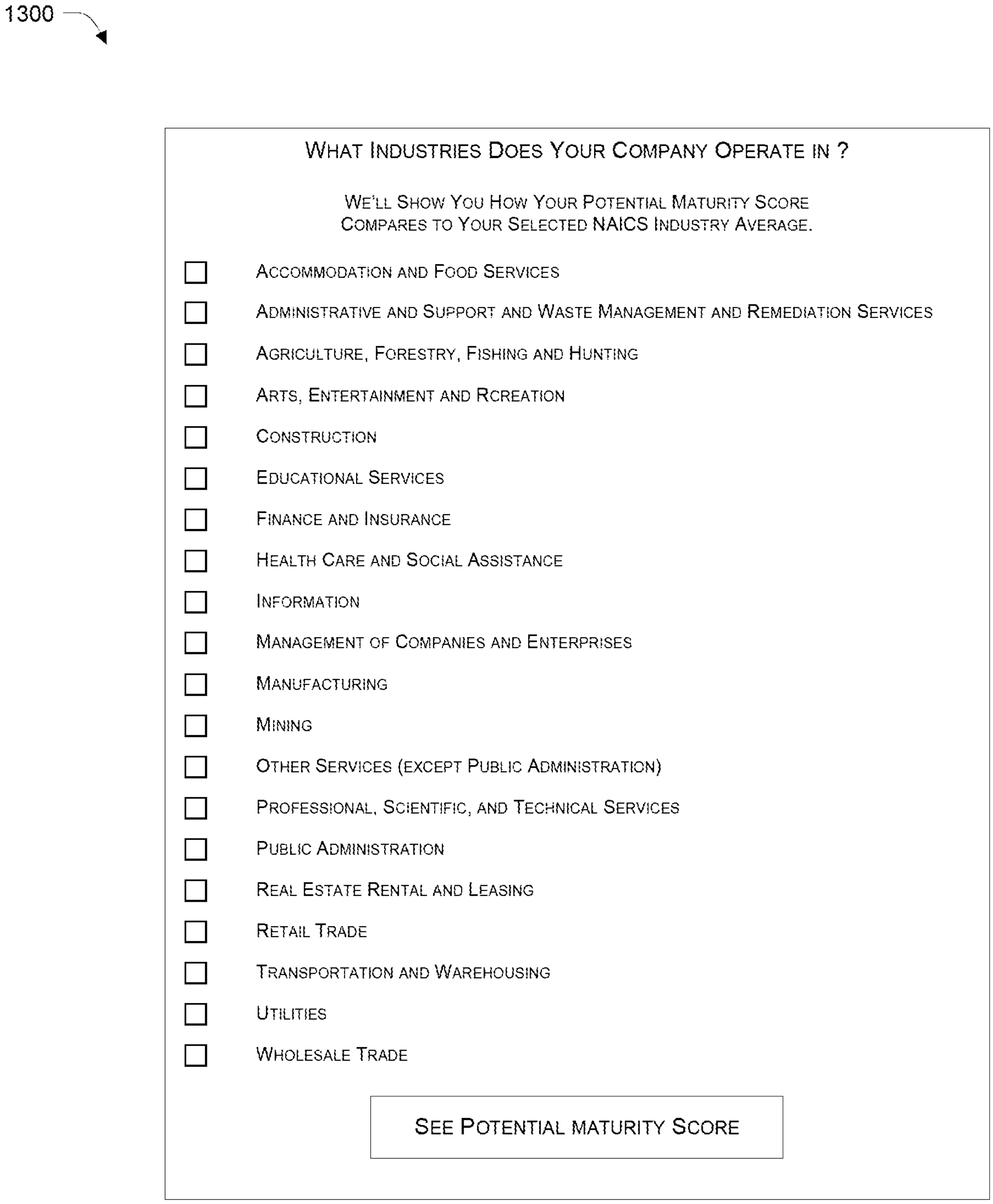

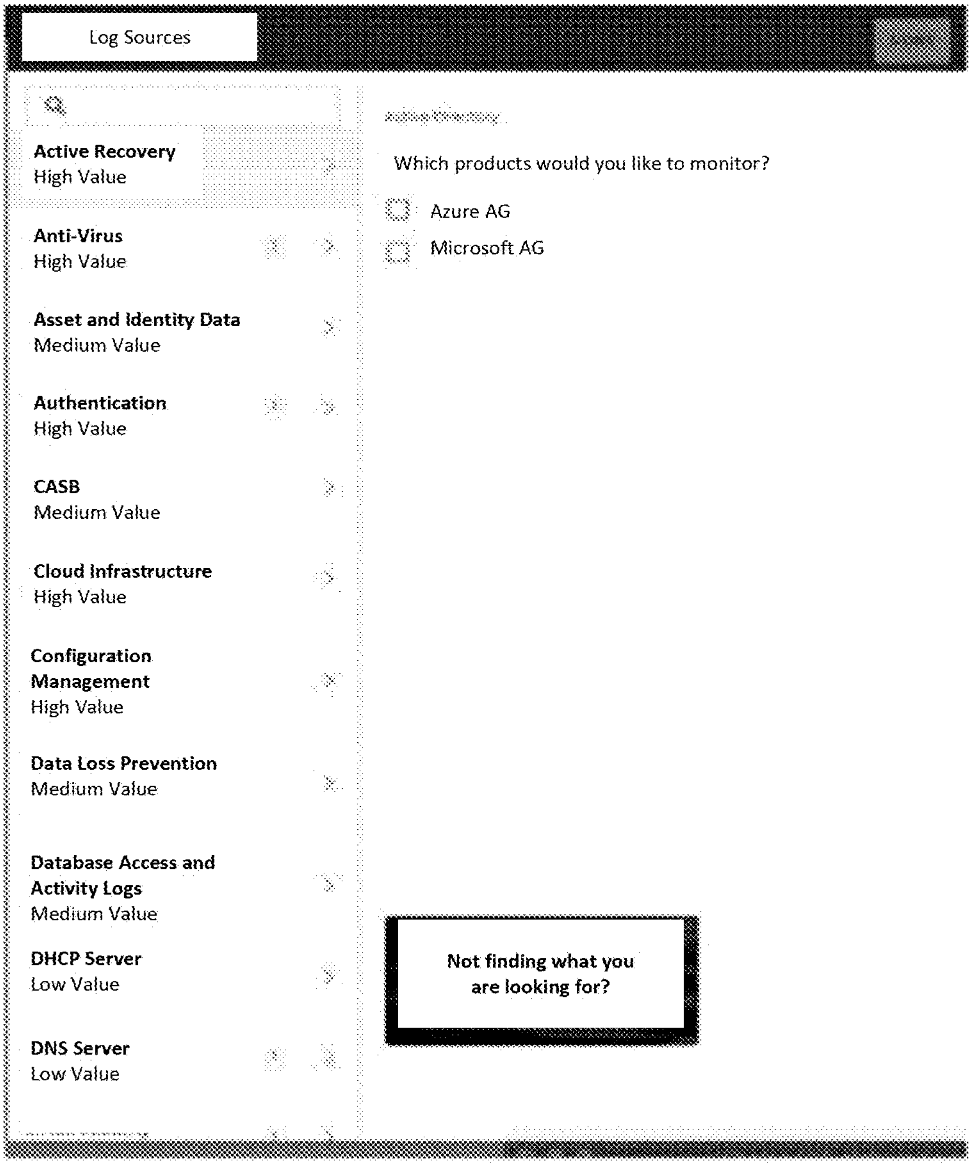

FIG. 15

Log Sources

Active Recovery
High Value

Anti-Virus
High Value

Asset and Identity Data
Medium Value

Authentication
High Value

CASB
Medium Value

Cloud Infrastructure
High Value

Configuration Management
High Value

Data Loss Prevention
Medium Value

Database Access and Activity Logs
Medium Value

DHCP Server
Low Value

DNS Server
Low Value

Which products would you like to monitor?

Azure AG

Microsoft AG

Not finding what you are looking for?

SYSTEMS AND METHODS FOR SECURITY OPERATIONS MATURITY ASSESSMENT

CROSS-REFERENCE PARAGRAPH

This application is a continuation of U.S. patent application Ser. No. 18/301,070, filed Apr. 14, 2023, entitled "Systems And Methods For Security Operations Maturity Assessment", which is a continuation of U.S. patent application Ser. No. 17/521,311, filed Nov. 8, 2021 (now U.S. Pat. No. 11,631,042), entitled "Systems and Methods for Security Operations Maturity Assessment", which is a continuation of U.S. patent application Ser. No. 17/025,783, filed on Sep. 18, 2020 (now U.S. Pat. No. 11,170,334), entitled "Systems and Methods for Security Operations Maturity Assessment", the disclosures of which are incorporated herein by reference in their entirety.

FIELD OF THE DISCLOSURE

Embodiments of the present invention generally relate to security operations (SecOps) assessment. In particular, embodiments of the present invention relate to monitoring, assessing, quantifying, and improving security operations (SecOps) maturity.

BACKGROUND OF THE DISCLOSURE

Individuals and organizations throughout the world are trying to ensure that their network, cyberspace, and systems dependent on it are resilient to increasing attacks. Organizations are more concerned about their cybersecurity than ever before as they are moving their infrastructure, data, and services into cloud platforms and are also subscribed to external services, APIs, and cloud infrastructure. In this connected world, Information Technology (IT) resources, which may include network infrastructures, data center infrastructures, external services, and internal resources of an organization, may be located in different jurisdictions and may have to be compliant to specific requirements of jurisdictions where segments of their IT resources are located. Security measures to be implemented to protect Information Technology (IT) infrastructures of an organization differ based on the nature of the business, size of the business, and type of internal and external IT resources used by the organization in addition to other factors.

As the organizations are implementing more and more security measures to secure their Information Technology (IT) resources, they are not able to assess whether the security measures are adequately performing their function and whether the security measures in place serve the requirements of compliance standards that apply to various segments of their IT environment.

Some attempts have been made in the past to solve some of the related problems discussed above. An example is disclosed in the United States granted U.S. Pat. No. 9,930,061 titled "System and Method for Cyber Attacks Analysis and Decision Support" (the "061 patent"). The '061 patent discloses a method for cyber-attack risk assessment, the method including continuously collecting, from a networked resource, cyber-attack data having multiple attack methods directed at multiple objectives. The method also collects organizational profile data, having: assets, each relevant to at least one of the objectives, and defensive controls, each configured to protect at least one of the assets by resisting one or more of the attack methods. The method continuously computes an enterprise risk score and an asset risk score for each of the assets. Each asset risk score is computed with respect to the attack methods directed at the objectives relevant to the asset, the defensive controls provided to protect the asset, and a maturity score representing the capability of the defensive controls to protect the asset. The method also continuously displays a dynamic rendition of the risk scores.

Another example is disclosed in the United States Patent Application No. 2019/0207968 titled "Methods and Systems for Providing an Integrated Assessment of Risk Management and Maturity for an Organizational Cybersecurity/Privacy Program" (the "'968 Publication"). The '968 Publication discloses systems and methods for computing a risk factor for a cybersecurity/privacy program implemented by an enterprise, computing a maturity factor for the cybersecurity/privacy program, and determining an integrated result for the cybersecurity program based at least in part on a combination of the risk factor and the maturity factor. In some embodiments, computing the risk factor may include computing a current risk management level and a target risk management level for the cybersecurity program, and computing the maturity factor may include computing a current maturity level and a target maturity level for the cybersecurity program. In some embodiments, the processor may be configured to perform operations that further include tracking any remediation activities based on the integrated result and monitoring any changes to the current risk management level or the current maturity level for the cybersecurity/review program.

Another example is disclosed in U.S. Pat. No. 10,592,938 titled "System and Methods for Vulnerability Assessment and Provisioning of Related Services and Products for Efficient Risk Suppression" (the "'938 patent"). The '938 patent discloses systems and methods for cyber vulnerability assessment include obtaining assessment data including information pertaining to domains of cybersecurity vulnerability of an enterprise and, for each security domain, a respective domain-level vulnerability score, identifying risk(s) relevant to the enterprise based on domain-level vulnerability score(s), identifying recommended products or services for mitigating each of the risks, and preparing a graphical user interface for selecting a portion of the recommended products or services. A user may select one or more products or services through the user interface for purchase and/or deployment planning. The domain-level vulnerability scores may be compared to peer vulnerabilities scores, target vulnerability scores, or prospective vulnerability scores based upon the application of certain recommended products or services.

Yet another example is disclosed in U.S. Pat. No. 8,196,207 titled "Control Automated Tool" (the "207 patent"). The '207 patent discloses a control automation tool ("CAT") that is configured for supporting discrete management of controls and their corresponding metrics. The control automation tool includes a software application connected with, stored on, and executed by one or more relational, closed-loop data repositories and computer systems. The use and maturation of control within an organization depend on management of operational performance and expenses, which the CAT assists through lean project management, effective implementation of action plans, and financial functions. Further, people resources, organizational hierarchy, and access management functions are used to support mapping of controls arranged by organizational units and support access permissions that are consistent with appropriate data management. The CAT also provides transparency and meaning to control and metric status and relevant data regarding controls and their associated metrics and is configured for ease of control and metric management via the CAT interface.

Therefore, there is a need for a system that can assess the security maturity of an organization in evolving cyberspace where resources located across different jurisdictions and exposure of the organization is not limited to the managed internal network. The organizations need to know what IT resources they need to manage, where those resources are, know where their security posture stands in this evolving IT environment, what they can do to improve it, and exactly what it will take to achieve that improvement The present disclosure makes possible a number of the needed solutions and makes a material and substantial improvement to the current state of the art for the assessment of security maturity for related purposes.

BRIEF SUMMARY OF THE DISCLOSURE

Systems and methods are described for assessing security maturity, identifying security gaps, and improving the security maturity level of an organization. According to an embodiment, a system receives onboarding inputs that include a list of data sources of an organization, a list of jurisdictions where the organization has a business interest, and a list of applicable use cases to track. The system collects data using custom rules from multiple data sources of the list of data sources, determines use case coverage, determines criticality score for each of the data sources, calculates data source coverage, calculates asset collection coverage, and determines an overall security maturity score of the organization based on above parameters using a maturity score model. The maturity score model above listed assessment parameters and data from different data sources and determines the security maturity score using a logistic equation. The equation is a function of the data source coverage, the asset collection coverage, the use case analytics coverage, the criticality score associated with each of the plurality of data sources, and asset coverage by each of the data sources. The system may further determine potential compliance coverage mapping and other factors that may be used to calculate the maturity score of the organization.

The system provides a user interface to receive onboarding inputs. For example, the system provides the user interface to receive a list of data sources of the organization, wherein the data source includes internal and external data sources forming part of the IT infrastructure of the organization. The list of data sources includes data center resources, internal network resources, cloud infrastructures, and software as a Service (Saas) services and serverless environments. The system receives other onboarding inputs, such as a list of security operations assets to be collected and monitored, and a list of use cases to track against selected data source assets. Once onboarding inputs are received, the system may initiate the process of tracking data sources, use cases, and may quantify the security maturity of the organization against all selected inputs and outputs.

The system calculates the data source coverage and asset collection coverage based on the data collected from data sources. The system may estimate compliance coverage of the organization based on the mapping of the use cases against respective compliance frameworks.

In an embodiment, the system determines the criticality score for each of the data sources based on different use cases covered by each of the data sources. The criticality score of a data source is a weighted criticality score of use cases covered by the data source. The weighted criticality score is determined using a historically developed criticality score matrix. In an embodiment, the system discovers one or more use cases covered by a data source and may use a machine learning model to determine the criticality score of the data source.

The system may also identify data sources of the list of data sources and inactive use cases of the list of use cases to further project improvement of the security maturity score of the organization as each of the data sources and inactive use cases becomes active. The system may benchmark the determined security maturity score with respect to multiple benchmarks. One such benchmark may include a potential security maturity score determined considering all data sources and use cases are active. Other benchmarks may include the security maturity score of a similar organization, security maturity score of industry related to the organization, security maturity score of a state, and security maturity score of a nation.

The system may identify security gaps of the organization based on benchmarking of the security maturity score with respect to multiple benchmarks and may recommend security improvement measures for the organization.

Other features of embodiments of the present disclosure will be apparent from accompanying drawings and detailed description that follows.

BRIEF DESCRIPTION OF THE DRAWINGS

The present subject matter will now be described in detail with reference to the drawings, which are provided as illustrative examples of the subject matter so as to enable those skilled in the art to practice the subject matter. It will be noted that throughout the appended drawings, like features are identified by like reference numerals. Notably, the FIGURES and examples are not meant to limit the scope of the present subject matter to a single embodiment, but other embodiments are possible by way of interchange of some or all of the described or illustrated elements and, further, wherein:

FIG. 5A illustrates an example list of data sources used for collecting data in accordance with an embodiment of the present disclosure.

FIG. 5B illustrates an example recommended list of data sources in accordance with an embodiment of the present disclosure.

FIG. 5C illustrates an example list of data sources having a low criticality score in accordance with an embodiment of the present disclosure.

FIG. 13 illustrates a list of industries against which one can benchmark their security operations maturity in accordance with an embodiment of the present disclosure.

FIG. 15 illustrates an exemplary user interface that allows customization of data sources in accordance with an embodiment of the present disclosure.

DETAILED DESCRIPTION OF THE EMBODIMENTS

Figure 1:
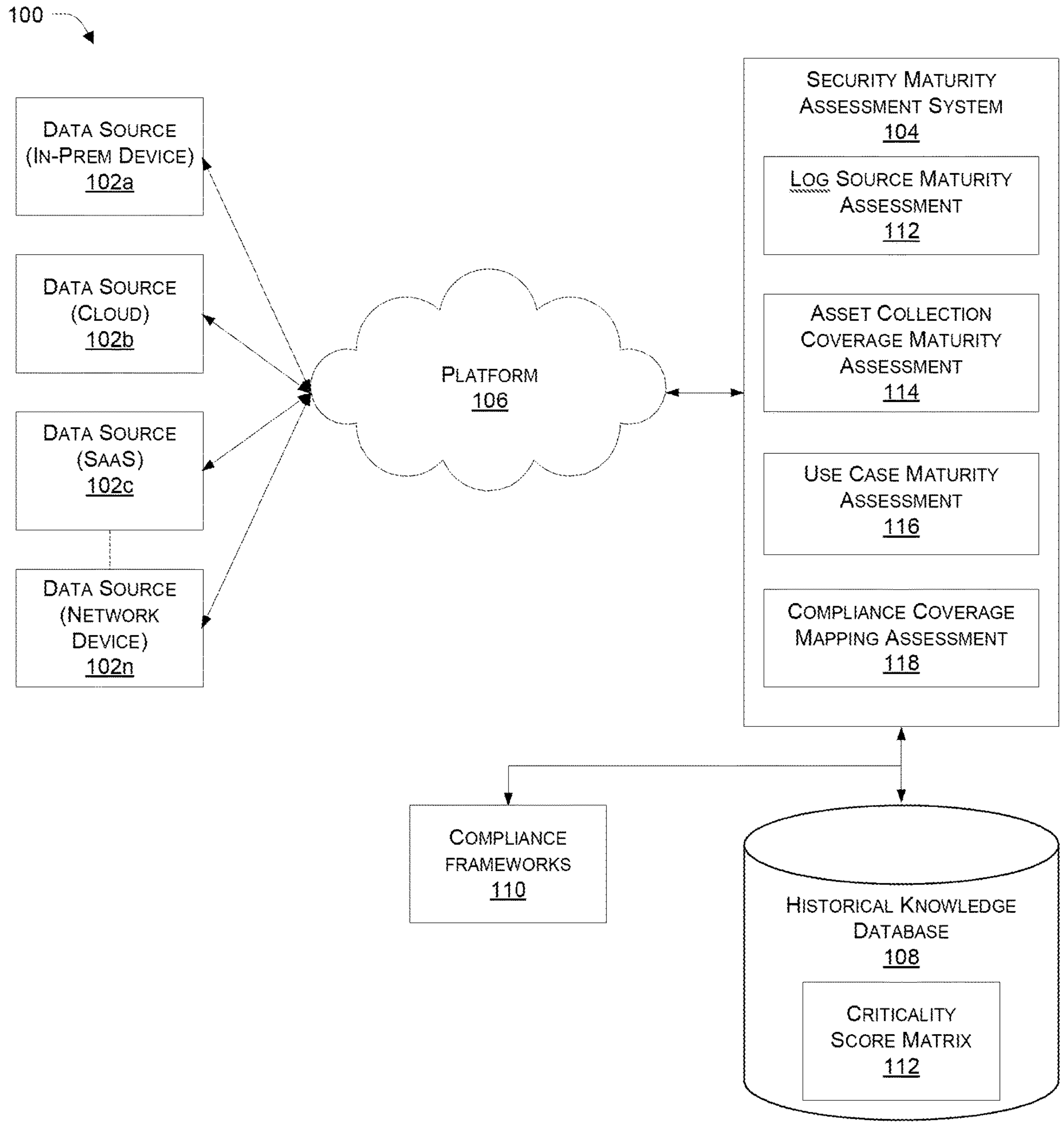
FIG. 1 conceptually illustrates a high-level block diagram of components used for assessing the security maturity of an organization in accordance with an embodiment of the present disclosure.

The detailed description set forth below in connection with the appended drawings is intended as a description of exemplary embodiments in which the presently disclosed process can be practiced. The term "exemplary" used throughout this description means "serving as an example, instance, or illustration," and should not necessarily be construed as preferred or advantageous over other embodiments. The detailed description includes specific details for providing a thorough understanding of the presently disclosed method and system. However, it will be apparent to those skilled in the art that the presently disclosed process may be practiced without these specific details. In some instances, well-known structures and devices are shown in block diagram form in order to avoid obscuring the concepts of the presently disclosed method and system.

Systems and methods for assessing security maturity, identifying security gaps, and improving the security maturity level of an organization are described. Described are systems and methods for monitoring, assessing, and improving the security maturity of an organization. In an embodiment, a system receives various inputs related to an organization's IT infrastructure, determines active and data sources for collecting data, collects data from data sources, determines coverage of these data sources, determines use cases covered by active security systems, maps those use cases with applicable compliance frameworks and computes a security maturity score of the organization using a logistic equation which is a function of above parameters.

The system may provide live security maturity score based on data collected from data sources and may also provide a projected security maturity score considering all available data source and security systems of the organization are active. The system can further benchmark the computed security maturity score with respect to the projected security maturity score and other industry benchmarks.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other types of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within the single computer) and storage systems containing or having network access to computer program(s) coded in accordance with various methods described herein, and the method steps of the invention could be accomplished by modules, routines, subroutines, or subparts of a computer program product.

The terms "connected" or "coupled", and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

As used herein, a "network security appliance" or a "network security device" generally refers to a device or appliance in virtual or physical form that is operable to perform one or more security functions. Some network security devices may be implemented as general-purpose computers or servers with appropriate software operable to perform the one or more security functions. Other network security devices may also include custom hardware (e.g., one or more custom Application Specific Integrated Circuits (ASICs)). A network security device is typically associated with a particular network (e.g., a private enterprise network) on behalf of which it provides one or more security functions. The network security device may reside within the particular network that it is protecting, or network security may be provided as a service with the network security device residing in the cloud. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VOIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances, messaging security appliances, database security and/or compliance appliances, web application firewall appliances, application acceleration appliances, server load balancing appliances, vulnerability management appliances, configuration, provisioning, update and/or management appliances, logging, analyzing and/or reporting appliances, bypass appliances, Domain Name Server (DNS) appliances, wireless security appliances, and DoS attack detection appliances.

As used herein a "network resource" generally refers to various forms of data, information, services, applications and/or hardware devices that may be accessed via a network (e.g., the Internet). Non-limiting examples of network resources include web applications, cloud-based services, networked devices and/or associated applications (e.g., user interface applications), and network security devices and/or associated applications (e.g., user interface applications). Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this invention will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular name.

FIG. 1 conceptually illustrates a high-level block diagram of components used for assessing security maturity of an organization in accordance with an embodiment of the present disclosure. As shown in FIG. 1, a security maturity assessment system 104 may receive data from multiple data sources through the collection and analysis platform 106. For example, the data sources may include a data source 102*a* that provides data from on-premise devices, data sources 102*b* that provide data from cloud infrastructure used by the organization, data sources 102*c* that provides data from SaaS services used by the organization, and data sources 102*n* that provide data from other networked devices of the organization. Each of the data sources 102*a-n* may receive data from multiple underneath connected devices and share the data with the security maturity assessment system 104.

The platform 106 collects data from different data sources 120*a-n* using wireless and wired connections, facilitate the transfer of data to the security maturity access system 104. The system 104 may quantify, track, and provide visibility and capability of security systems or services of the organization. System 104 may determine a maturity score of the organization and quantify it in a predefined range. For example, the system may provide a score in the range of 010, wherein 10 indicates the best possible security maturity of any organization.

In some embodiments, data sources 102*a-n* may include a firewall, an Endpoint Detection & Response (EDR) system, an Antivirus (AV), a web server, a Web Application Firewall (WAF), an email security system, a Windows domain controller, an authentication system, a remote access control system, a web proxy, a cloud service API, a cloud infrastructure, a cloud security system, a Windows member server, a Linux server security system, an active directory infrastructure, an Intrusion Detection System (IDS), an Intrusion Prevention System (IPS), a privileged account management system, a DNS server, a Data Loss Prevention (DLP) system, a network infrastructure, a Host Based Intrusion Detection System (HIDS), a Dynamic Host Configuration Protocol (DHCP) server, a configuration management tool, a database access and activity logging system, a vulnerability management tool, an asset identity data source, a workstation operating system, an email server and other security systems and networked devices.

System 104 may allow defining custom rules and policies to collect data from data sources 102*a-n*. These custom rules and policies may be defined to optimize the collection of relevant data data. System 104 may support the collection of data from data sources of different vendors. Custom rules, policies, and logics may be defined for collecting data from data sources of different vendors using different technology stacks.

Table-1 illustrates an example list of technology stacks, products, and vendors for which custom rules for data collection may be defined in the spirit of representing the data type categories/sources and example technologies/products.

In some embodiments, use cases may be categorized in the form of criticalities such as "High" use cases, "Medium" use cases and "Low" use cases. Use case categorization may be used to determine the criticality of such use cases. Use cases marked as high may include security features related to the detection of cyber threats. Use cases marked as "Medium" may relate to security features associated with advanced detection and investigation. Use cases marked as "Low" may relate to security features associated with data correlation and analytics for taking corrective measures, automated blocking and tackling, as well as lower value findings.

In an embodiment, system 104 may determine the score for each individual segment of IT infrastructure of the organization. For example, system 104 may determine the data center maturity score, cloud service provider maturity score, software as a Service (SaaS) maturity score. As one may appreciate, system 104 may assess security maturity of cloud infrastructures and cloud services as well, in addition to security maturity assessment of internal network and

TABLE 1

Data sources and example technology stacks supported by security maturity assessment systems.

| Data Source | Example Technologies |
|---|---|
| Firewall | Palo Alto Networks, Checkpoint, Fortinet |
| Endpoint Detection & Response (EDR) | Crowdstrike, Carbon Black Respond, Cylance, SentinelOne |
| Anti-Virus (AV) | McAfee, Symantec Endpoint Protection (SEP), Carbon Black Defense, McAfee ePO |
| Web Server/WAF Data | Incapsula (WAF), W3C Web Logs, Access-Combined Web Logs, Microsoft IIS |
| EMail Security | Mimecast, Proofpoint, IronPort |
| Data Source | Example Technologies |
| Windows Domain Controllers (OS-Windows) | Windows Security Logs, Windows Application Logs, Windows System Logs, PowerShell Logs, AD Authentication |
| Multi-Factor Authentication (MFA) | Okta, Duo, RSA SecurID |
| Remote Access | Cisco ASA (AnyConnect), Citrix, RDP |
| Web Proxy | Zscaler, Bluecoat, Next Generation Firewall (NGFW) |
| Cloud | Microsoft Azure, Microsoft O365, Google Cloud Platform (GCP), Amazon Web Services (AWS), Box |
| Cloud Security | sift, redlock |
| Windows Member Servers (OS-Windows) | Windows Security Logs, Windows Application Logs, Windows System Logs, PowerShell Logs, Local Authentication |
| Linux Server Secure & Audited Logs (OS-Linux) | secure logs, audited logs |
| Active Directory Infrastructure | Operational-Site-Health-Replication |
| Intrusion Detection Systems (IDS) & Intrusion Prevention Systems (IPS) | Snort, Bro, Next Generation Firewall (NGFW) |
| Privileged Account Management | CyberArk |
| DNS Server | Windows DNS Server, Infoblox, Cisco Umbrella |
| Data Loss Prevention (DLP) | Netskope, Symantec DLP |
| Network Infrastructure | Cisco, Juniper, Meraki, NetScaler |
| Host Based Intrusion Detection System (HIDS) | OSSEC, McAfee HIDS |
| DHCP Server | Windows DHCP Server |
| Configuration Management Tools | Puppet, Windows SCOM, Windows SCCM, Chef, Ansible |
| Database Access & Activity Logs | Microsoft C2 Auditing |
| Vulnerability Management Tools | Tenable, Qualys, Rapid7 |
| Asset & Identity Data | LDAP, Active Directory Objects |
| Workstation Operating System (OS) Logs | Windows Security Logs, Windows Application Logs, Windows System Logs, PowerShell Logs |
| Email Server | Microsoft Exchange |

In some embodiments, data sources may be categorized into "High" value data sources, "Medium" value data sources, and "Low" value data sources and may be assigned separately. High-value data sources may include platforms that directly address the confidentiality, integrity, or availability of a customer's operational environment. For example, High-value data sources may include firewalls, email security, proxy, and authentication devices. Medium and Low value data sources are typically supplemental sources that can provide further enrichment within the customer's environment. For example, Medium value data sources may include a vulnerability management system, LDAP server, and Configuration Management integration system.

on-premises devices. System 104 may perform data source maturity assessment 112, asset collection maturity assessment 114, use-case maturity assessment 116, and compliance maturity assessment 118 for determining an individual score for coverage maturity, data source maturity, use case maturity, and compliance maturity, respectively, at a granular level. System 104 may determine the overall maturity score of the organization based on factorized collective scores of the above parameters.

The security maturity assessment system 104 may perform data source maturity assessment 112 to assess data source coverage percentage, which is the percentage score of IT resources of the organization from where data can be collected out of total IT resources of the organization. For example, if there are a total 100 IT resources of the organization and data can be collected from only 80 IT resources, the coverage percentage would be 80. As one may appreciate, organizations should aim to get maximum visibility and be able to gather, identify, and perform advanced data collection from all their IT resources. The higher the data source coverage, the higher the maturity score of the organization. Collections of data enable the model to assess whether the security systems are working, what threats are being detected, what preventive actions are being taken by respective security systems and may also assist in identifying security gaps. Similarly, system 104 may perform asset collection coverage maturity assessment 114 to assess where IT resources of the organization are located across the globe and assess from which locations data can be collected out of all existing locations. The goal is to increase data collection and coverage from different data sources for better accuracy.

In an embodiment, system 104 may enable self-assessment of data source maturity and asset collection coverage maturity through a customer onboarding module. The customer onboarding module may collect data related to an organization through an interactive user interface. In an embodiment, the customer onboarding module may collect required data associated with an organization if permissions are granted to discover IT infrastructure of the organization.

System 104 may perform use case maturity assessment 116 to determine different security use cases covered by different security systems of the organization. The use cases are logical grouping of characteristics or rules that define or identify a specific threat or security scenario. The use case maturity assessment 116 provides an indication of how prepared the organization is for different types of cyber threats. Use case maturity assessment 116 may provide an indication of use case coverage percentage based on available use cases covered by the data sources. System 104 may refer to a content library or historical knowledge database 108 that lists all possible use cases to determine required use cases for an organization and determine much of those required use cases are covered by the data sources.

System 104 may refer to historical knowledge database 108 to determine the criticality of each of the data sources. Historical knowledge database 108 may maintain a criticality score matrix 112, which may include all possible use cases that a data source may cover and a use case criticality score against each of the use cases. The use case criticality score may be assigned manually based on historical knowledge. In an embodiment, the use case criticality score may be assigned by a machine learning model based on the nature of the business of the organization and the impact of different security coverage provided by a use case. The machine learning model may assign a use case criticality score and can further provide a criticality score for each of the data sources. System 104 may determine the criticality score of a data source based on use cases covered by the data source. The criticality score to a data source may be assigned as 3 to indicate very high criticality, 2 to indicate high criticality, 1 to indicate medium criticality, and 0 to indicate low criticality. To maximize the maturity score, the organization should ensure data sources with criticality scores of 3 and 2 are active and have the capability to share data. Some of the factors that can be used to determine the criticality score of data source may include determination of whether the data source contains data for external authentication capabilities, whether the traffic through the data source is inbound traffic, outbound traffic, or internal traffic, whether the data source contains potential security threat reports, whether the data source contains potential Indication of Compromise (IoC) data, and whether the data source and use cases covered by it assist in finding advance threats (e.g., kerberoasting, lateral movement, live off the land, etc.).

[Security maturity assessment system 104 may perform compliance maturity assessment to determine a compliance score of the organization against different compliance frameworks 110. Applicable compliance framework(s) for an organization may differ depending on the location of its IT resources, size of the organization, nature of the business, type of data that it processes, and other such factors. System 104 may find one or more applicable compliance requirements and suitable compliance frameworks against which the compliance maturity assessment 118 may be performed. Example compliance frameworks may include but are not limited to MITRE ATT&CK, Center for Internet (CIS) Benchmark, Lockheed Killchain, and National Institute of Standards and Technology (NIST) Cyber Security Framework (CSF). System 104 may determine compliance coverage based on active use cases.

System 104 may use respective maturity scores from data source maturity assessment 112, asset collection coverage maturity assessment 114, use case maturity assessment 116, and compliance maturity assessment 118 to determine an overall security maturity score of the organization.

Figure 2:
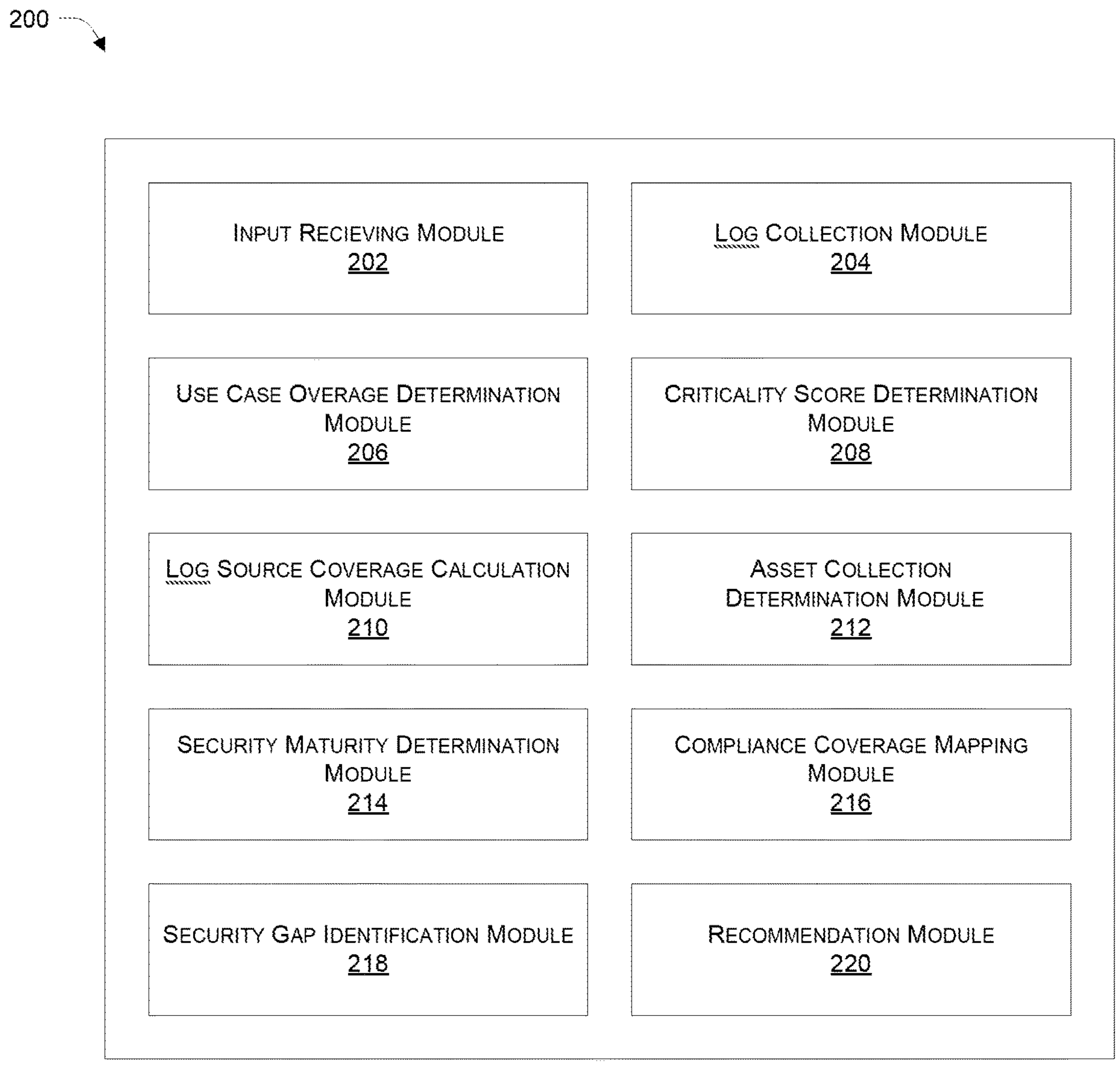
FIG. 2 illustrates functional modules of a security maturity assessment system in accordance with an embodiment of the present disclosure.

FIG. 2 illustrates functional modules of a security maturity assessment system in accordance with an embodiment of the present disclosure. Security maturity assessment system 104 is also referred to as the security maturity assessment system 200 throughout this document for case of explanation. System 200 may help organizations in their effort to improve their security monitoring, alerting & responding capabilities. System 200 model consists of tiers that detail the required data sources and associated use cases that organizations should monitor. Each of the use cases may be mapped to a phase of the maturity model to simplify maturity assessments for already onboarded organizations and new customer onboarding project plans. System 200 may provide valuable insight into organizational security posture through benchmarking against their own operations and industry benchmarks. System 200 may help cybersecurity leaders with quantitative data that demonstrate their security operation progress.

Security maturity assessment system 200 includes input receiving module 202 configured to receive onboarding inputs, including a list of data sources of an organization, a list of jurisdictions where the organization has a business interest, and a list of use cases to track. System 200 may include data collection module 204 configured to collect data using custom rules from a plurality of data sources of the list of data sources, a use case coverage determination module 206 configured to determine use case coverage by the plurality of data sources by referring to a content library, a criticality score determination module 208 configured to determine a criticality score for each data source of the plurality of data sources based on one or more use cases covered by respective data source, data source coverage calculation module 210 configured to calculate data source coverage based on the data received and the list of data sources, an asset collection coverage determination module 212 configured to determine asset collection coverage based on the data received and the list of data sources, and security maturity determination module 214 configured to determine a security maturity score of the organization using a maturity score model. The maturity score model may be a function of the data source coverage, the asset collection coverage, the criticality score associated with each of the plurality of data sources, the compliance coverage, asset coverage by each the plurality of data sources, and use case coverage.

In an embodiment, security maturity assessment system 200 may allow a customer, upon authentication, to access system 200 through a web-application, a stand-alone on-premise system, or through a dedicated application. In an embodiment, the input receiving module 202 may receive a list of IT resources of an organization, asset collection presence, and use case details. The input receiving module 202, also referred interchangeably as a customer onboarding module may provide an interactive user interface to the customer to receive a list of IT resources of an organization. As one may appreciate, these IT resources of the organization may be located across different jurisdictions. Input receiving module 202 may present a form to be filled with onboarding inputs about the organization for which maturity assessment needs to be performed. An organization may access, once authenticated, a customer onboarding portal through an interactive user interface. The input receiving module 202 may request through an onboarding portal basic details of an organization, such as organization name, parent organization name, username, email address, the contact information of a person concerned, business unit details, industry details, competitors' details, list of subsidiaries, annual revenue, etc. The input receiving module 202 may receive industry driven compliance requirements of the organization and one or more compliance drivers for the organization based on business-driven regulatory requirements. Some of these customer details may not be mandatory and can be skipped. The input receiving module 202 may also receive a list of continents, regions, countries, and states where IT resources of the organization may be located or where the organization may have a business interest.

In an embodiment, the input receiving module 202 may also receive coverage details such as a list of data sources, number of domain controllers, details about cloud providers, details of endpoint security providers, number of endpoints, location of data centers and critical resources, etc. from customers. The input receiving module 202 may display customer detail completeness score in percentage to indicate missing details, which can always be updated by the customer. In an embodiment, the input receiving module 202 may determine missing details about the organization based on the partially filled customer details. For example, if the size of the organization and nature of business is known, input receiving module 202 may determine the compliance requirements of the organization.

The input receiving module 202 may also retrieve required onboarding inputs related to an organization automatically if permission is granted by the IT resource manager to discover IT resources if the organization. The input receiving module 202 may analyze network traffic of the organization and discover available IT resources of the organization. Input receiving module 202 may present the discovered IT resources of the organization for correction if required. Once the onboarding details of the organization is in place, system 200 may perform a security maturity assessment of the organization.

Data collection module 204 may collect data from data sources from the list of data sources. As one may appreciate, from the list of data sources, provided or discovered by the input receiving module 202, there may be some active (currently collected) data sources and some inactive (not currently collected, planned) data sources. Data sources are those that are not operational due to some technical issue or those from which data can't be collected. Data collection module 204 may actively collect data from the data sources.

In an embodiment, each of the data sources may be configured to share data almost in real-time with data collection module 204. Data collection module 204 may provide custom rules and policies to receive data in order to optimize collection. Data collection module 204 may be configured to collect data only when the defined set of rules or policies are met.

Use case coverage determination module 206 of system 200 provides a percentage score of active use cases against a list of use cases recommended and stored in a content library for the organization.

Criticality score determination module 208 of system 200 may determine the criticality score for each of the data sources. Criticality score determination module 208 may explore one or more use cases covered by a data source, refer to a criticality score matrix that maintains the criticality score for each use case to determine the criticality score associated with each of the use cases and determine criticality score of the data source. The criticality score of the data source may be the weighted average of the criticality score of each of the individual use cases covered by the data source. The criticality score matrix maintains the criticality score against known use cases based on historical knowledge. In an embodiment, the criticality score for a new use case may be estimated based on the matching of the new use case with an existing use case. The matching use case may depend on the type of security coverage provided by use cases. In an embodiment, criticality score determination module 206 may use a machine learning model to determine the criticality score of a new use case or a data source based on historical learning. The criticality score to a use case may be assigned as 3 to indicate very high criticality, 2 to indicate high criticality, 1 to indicate medium criticality, and 0 to indicate low criticality. To maximize the maturity score, the organization should ensure use cases with criticality scores of High and Medium are active and have the capability to share data. Some of the factors that can be used to determine the criticality score of use cases and criticality score of data sources may include the determination of whether the data source contains data for external authentication capabilities, whether the traffic is inbound traffic, outbound traffic, or internal traffic, whether use case contains potential security threat reports, whether the use contains potential Indication of Compromise (IoC) data, and whether the use case assists in finding advance threats (e.g., kerberoasting, lateral movement, live off the land, etc.). As mentioned earlier, the criticality score of the data source may be determined based on the weighted average of the criticality score of use cases covered by the data source.

Data source coverage maturity calculation module 210 of system 200 may calculate data source coverage based on the data received and the list of data sources to assess percentage coverage of data collection out of all existing IT resources of the organization. System 200 should be able to collect data from maximum IT resources for better security maturity score. Data sources should be able to monitor all IT resources of the organization and provide data to data collection module 204. Data source coverage calculation module 208 may determine out of all existing data sources how many are data sources and how many are data sources. Module 210 may calculate the percentage score of data sources from which data collection module 204 is able to collect data over total data sources of the organization. As one may appreciate, each data source may cover one or more IT resources of the organizations and may provide data on behalf of one or more IT resources.

Asset collection coverage determination module 212 may determine asset collection coverage based on the data received and the list of data sources. Module 212 evaluates out of all data sources located across different jurisdictions from how many jurisdictions data source collection module 204 is able to collect the data. For a better maturity score, for each jurisdiction, depending on the residing IT resources in each jurisdiction, system 200 should be able to collect data from respective data sources. To ensure IT resources of the organization are secure in each jurisdiction. It is essential that all the security systems responsible for the security of respective jurisdictions are active and provide data for further analysis. Asset collection coverage determination module 210 may provide a percentage of asset collection coverage by the data sources.

Security maturity determination module 214 may determine the overall security maturity of the organization using a security maturity model. In an embodiment, the security maturity model may be a logistic equation, which is a function of the data source coverage, the asset collection coverage, the use case coverage, the criticality score associated with each of the plurality of data sources, and asset coverage by each the plurality of data sources. In an embodiment, the maturity model may receive data associated with data source coverage, asset collection coverage, use case coverage, and weighted average of collection asset coverage per data source by all data sources and quantify the security maturity of the organization in a range of 0-10, wherein security maturity score-10 is the best possible score.

System 200 may further include compliance coverage estimation module 216 configured to estimate compliance coverage of the organization based on actual compliance by IT resources of the organization located in each of the plurality of jurisdictions against respective compliance frameworks. Compliance coverage estimation module 216 may map active use cases against compliance requirements and determine the compliance coverage accordingly. Compliance coverage estimation module 216 may estimate compliance coverage of the organization based on actual compliance by IT resources of the organization located in each of the plurality of jurisdictions against respective compliance frameworks. In an embodiment compliance coverage estimation module 212 can determine out of all application use cases recommended under a specific compliance framework how many use cases are implemented by the organization and are active. The compliance coverage estimation module 216 may estimate a compliance score based on the mapping of the active use cases with compliance frameworks. Example compliance frameworks include MITRE ATT&CK, CIS benchmark, Lockheed Killchain, and NIST CSF.

System 200 may further include a benchmarking module configured to benchmark the security maturity score with respect to one or more benchmarks. The one or more benchmark may include a potential security maturity score determined using the maturity score model, wherein the potential security maturity score is determined considering all of the plurality of data sources are data sources. In an embodiment, the one or more benchmarks may include the security maturity score of a similar organization or security maturity score of industry related to the organization.

System 200 may further include security gap identification module 218 configured to identify one or more security gaps based on the benchmarking and compliance mapping. Security gap identification module 218 may receive input from the mapping of use cases against the compliance framework and identify missing use cases. Similarly, the security gap identification module 218 may receive input from the benchmarking module, which provides a comparison of the security maturity score against one or more benchmarks. If the determined security maturity score of the organization is less than the compared benchmark, module 218 may determine missing use cases not covered by the organization. System 200 may further include recommendation module 220 configured to provide recommendations for security maturity improvement based on input received from the security gap identification module 218. The missing use cases identified by module 218 may be provided as a recommendation for the organization, as it may help improve the overall security maturity of the organization.

Figure 3A:
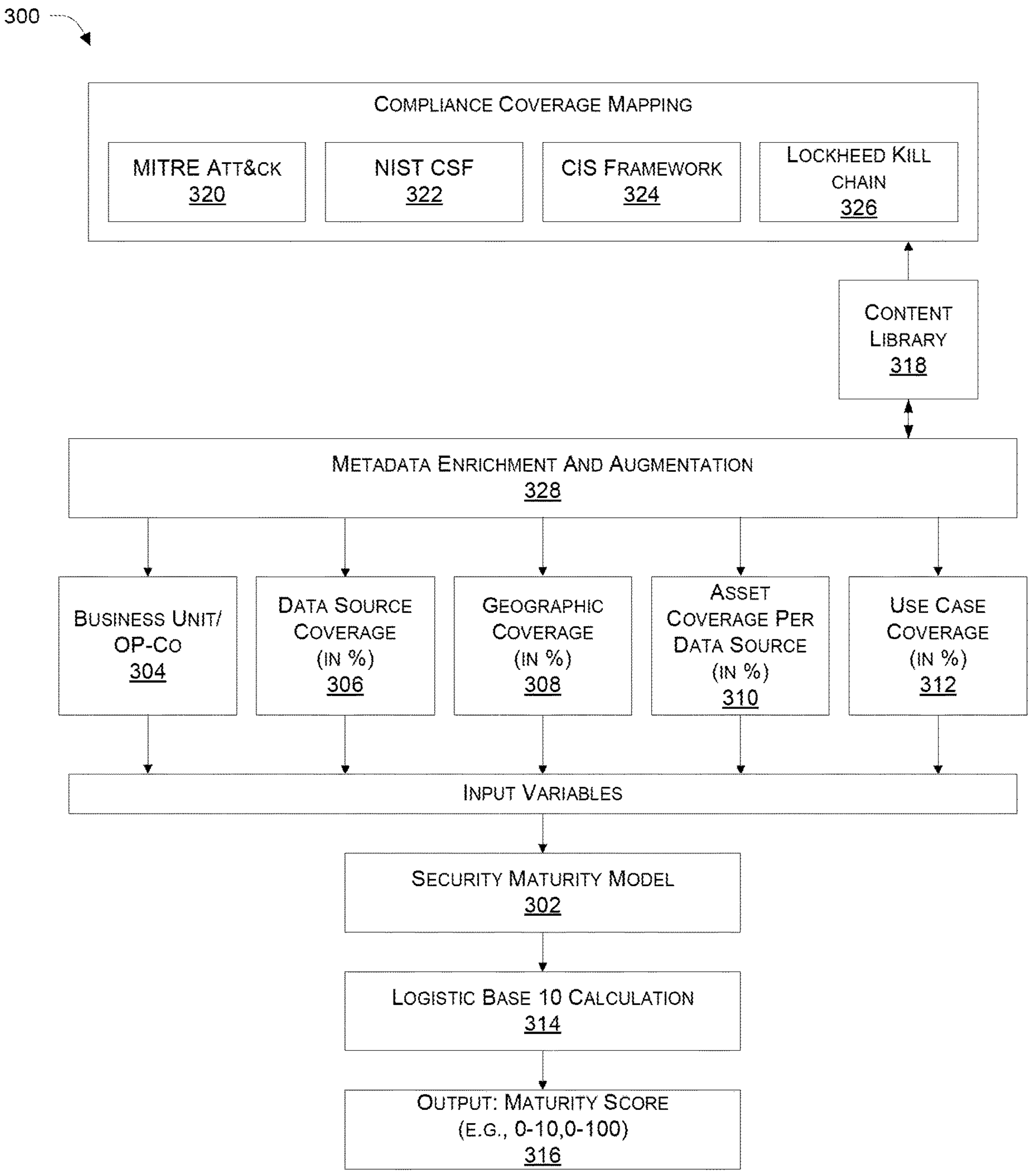
FIG. 3A illustrates an exemplary maturity score model used to determine maturity score of an organization in accordance with an embodiment of the present disclosure.

FIG. 3A illustrates an exemplary maturity score model used to determine the maturity score of an organization in accordance with an embodiment of the present disclosure. As illustrated in FIG. 3, security maturity model 302 may receive various input variables, such as details of from different business units/Op-Co 304 of an organization, data source coverage 306, asset collection coverage 308, asset coverage per data source 310, and use case coverage 312. Security maturity model 302 may perform logistic calculation 314 based on values of the input variables (which may in terms of % values) and provide output maturity score 316 in range (e.g., 0-10, 0-100, etc. In an embodiment, where the range is 0-10, the maturity score-10 indicates the best possible score. Similarly, if the range is between 0-100, the maturity score-100 indicates the best possible score. The score may be represented in integer form or decimal values for more accurate representation. In an embodiment, the score can also be presented in the form of grades (e.g., A++, A+, A, B++, B+, etc.) As one may appreciate, to represent maturity score, any define scale can be used. To determine use case coverage, content library 318 may be referred. Content library 318 may contain a compiled list of use cases recommended under different compliance frameworks, such as MITRE ATT&CK 320, NIST CSF 322, CIS Framework 324, and Lockheed Kill Chain 326.

In an embodiment, metadata enrichment and augmentation module 328 may work as an abstraction layer for pushing and pushing data from content library 318 and storing data collected from different sources. The metadata enrichment and augmentation module 328 may collect metadata, augment the metadata, and add additional context in input variable mapping.

Figure 3B:
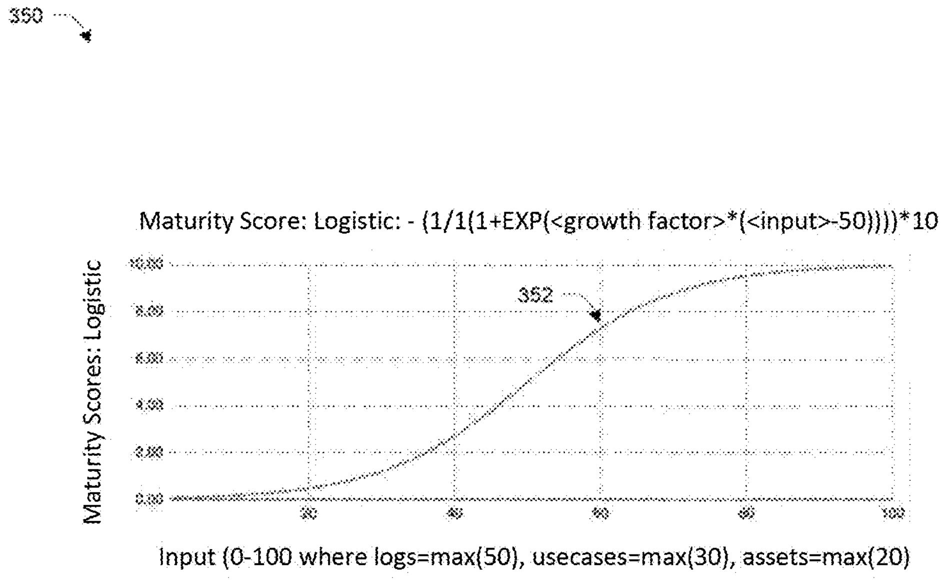
FIG. 3B illustrates example maturity scores over a period of time for a customer measured in accordance with an embodiment of the present disclosure.

FIG. 3B illustrates example maturity scores over a period of time for a customer measured in accordance with an embodiment of the present disclosure. The security maturity assessment system uses a logistic equation like the one above to determine the overall maturity score. As shown in FIG. 3B, the security operations maturity of organization increases as their visibility into data sources increases. The curve 352 represents the increasing operations maturity of the organization. An organization that has no visibility into its data, getting started, has a huge value by additional data sources. Once on the maturity path to increase, the organizations increase their visibility into data sources, there becomes a break in the return on investment and improvement in collection-visibility-detection-analysis. As an obvious result, the return of adding more data sources diminished at higher levels of security maturity. As one may appreciate, it is more difficult to move up the curve with just a few pieces of information, but as the organization grows in maturity, it moves up the curve, and incremental gains are harder to achieve at higher levels of maturity. FIG. 3B, represents the best potential curve to model out the case of implementation vs. the gains in security that happen along the maturity curve. As one appreciates, for better assessment for the security maturity of an organization, it is important to capture comprehensive details about IT resources of the organization.

Figure 4:
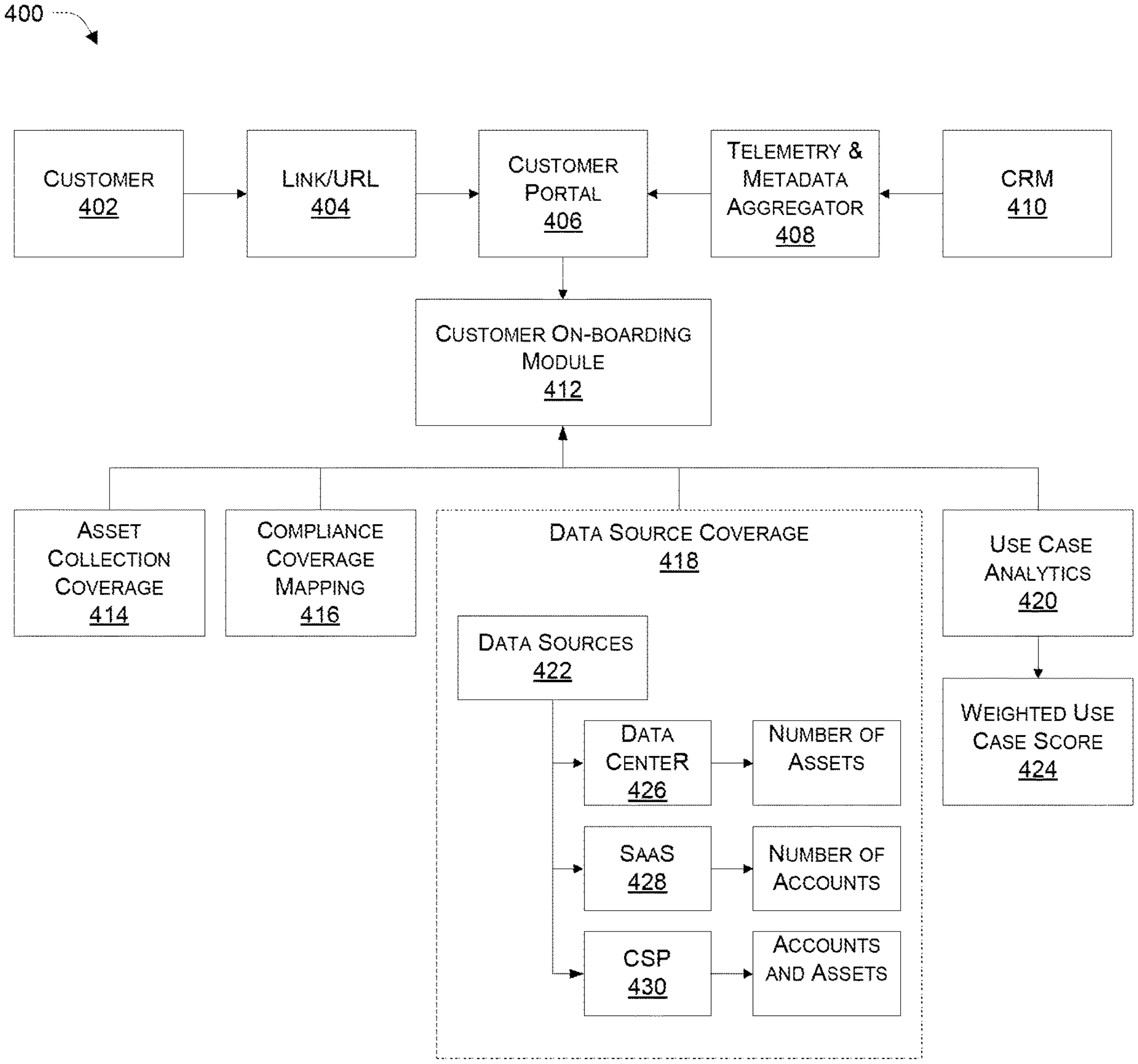
FIG. 4 illustrates an example block diagram of an input receiving module in accordance with an embodiment of the present disclosure.

FIG. 4 illustrates an example block diagram of an input receiving module in accordance with an embodiment of the present disclosure. The input receiving module 202 is also referred to as the customer onboarding module 412 here for simplicity of explanation. The input receiving module 202 or customer onboarding module 412 may provide customer 402 Link/URL 404 through which customer 402 may access customer portal 406. Customer Portal 406 may maintain updated details about the customer and its IT resources. Customer onboarding module 412 may input details such as asset collection coverage 414, compliance coverage 414, data source coverage 418, and potential use case analytics 420. Customer onboarding module 412 may provide asset collection coverage 414, such as continents, regions, and countries where the customer may have its IT resources and business interest. Customer onboarding module 412 may provide a list of potential data sources 412, which may include data center 426, SaaS 428, and Cloud Service Provider (CSP) 430 of the customer. Customer onboarding module 412 may list the number of assets covered by each selected data source(s). Based on the inputs received through customer onboarding module 412, potent use case analytics 420 may be performed, and a weighted use case score may be determined. Customer onboarding module 412 may receive a list of IT resources and data sources, wherein the criticality level of each IT resource, use case, and data source may be different.

FIG. 5A illustrates an example list of data sources used for collecting data in accordance with an embodiment of the present disclosure. Each data source may provide data from one or more security systems covering one or more use cases. Based on use cases covered by each of the data sources criticality score may be assigned for each data source. As shown in FIG. 5A, a data source may include a firewall, EDR, AV, web server, WAF data source, Email security system, Windows Domain controller, MFA server, remote access control system, web-proxy, cloud infrastructure, cloud service, cloud security, Windows member server, Linux server security and audio log device, active directory infrastructure, IDS, IPS, and privileged account management system and these data sources may be active for any mature organization of significant size. Criticality for these data sources may be high, which may be represented as 1 in numerical terms. FIG. 5B illustrates an example recommended list of data sources in accordance with an embodiment of the present disclosure. Other data sources with lower criticality score may also be recommended by the system to be active. FIG. 5C illustrates an example list of data sources having a low criticality score in accordance with an embodiment of the present disclosure. Other data sources with lower criticality score may also be recommended by the system to be active.

Figure 6:
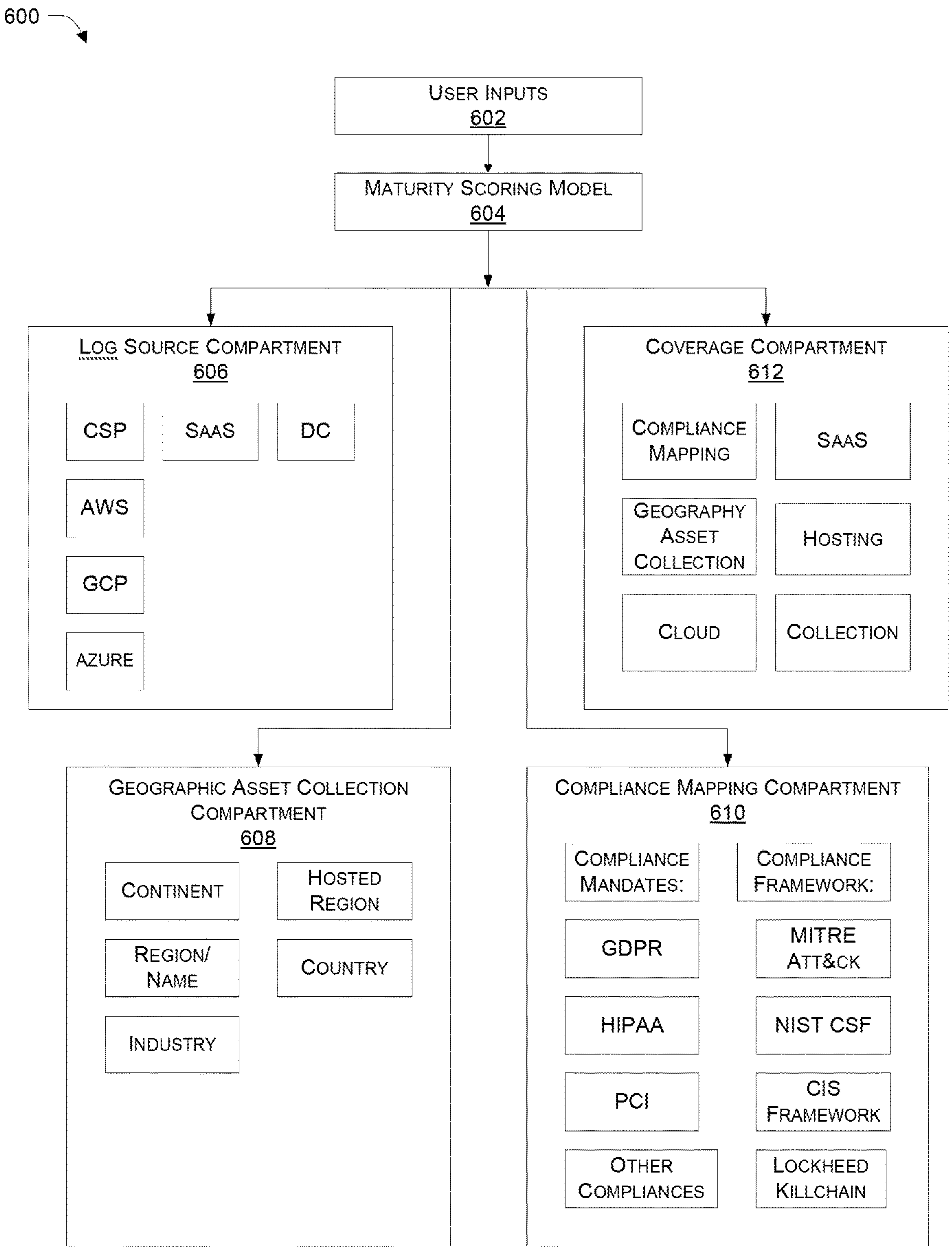
FIG. 6 illustrates an example of the maturity score/scoring compartments used in assessing the maturity of an organization in accordance with an embodiment of the present disclosure.

FIG. 6 illustrates an example maturity score compartments used in assessing maturity of an organization in accordance with an embodiment of the present disclosure. Maturity scoring module 604 may include different functional compartments, such as data source compartment 606, may contain and support calculations and scoring of a geographical asset collection compartment 608, geographic asset collection coverage mapping compartment 610, and compliance mapping compartment 612 may be able to perform specific evaluations related to data source, geographic asset collection, compliance mapping, and use case coverage respectively. Maturity scoring module 604, also referred to as the security maturity determination module, may receive potential customer inputs 602 and may perform assigned functions related to respective compartments. For example, data source compartment 606 may enable the system to collect data from different data sources or data points where security threats can be best detected over time. In an embodiment, the asset collection compartment 608 may receive regional threat intelligence based on geographical coverage input provided by the customer and may assess the security preparedness based on that regional threat intelligence to determine geographical coverage. Compliance compartment 610 may check if the security measures in place meet the compliance mandates of an organization. Compliance compartment 610 may enable mandate checks as well as may programmatically guide the organization to improve its security measures to gain better security maturity. Coverage compartment 612 enables a holistic view of the visibility of IT resources of the organization and highlights business risks if any essential coverage is missing.

The security maturity scoring model may help organizations proactively drive security operation maturity through quantitative analysis and industry benchmarking.

Figure 7:
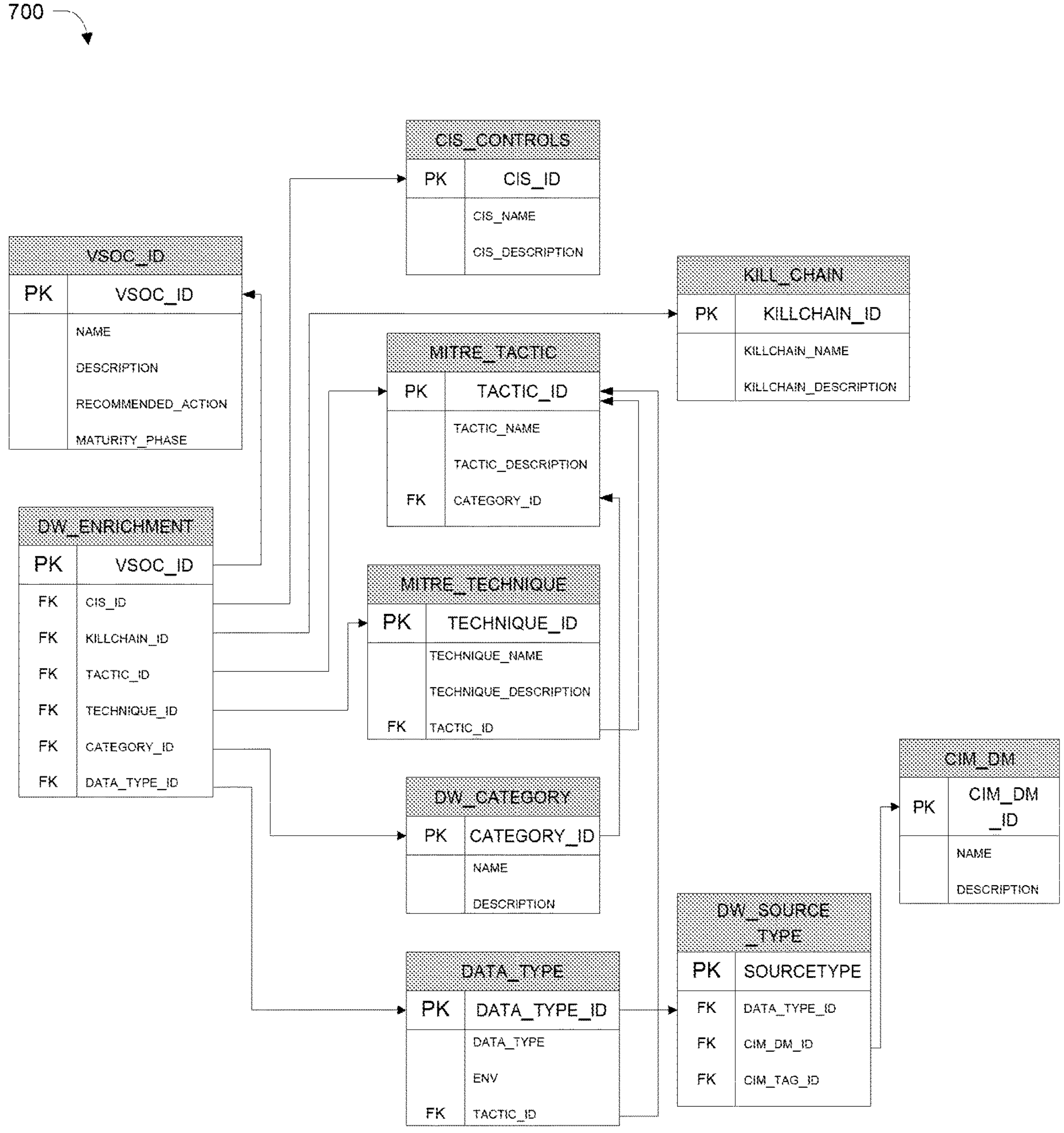
FIG. 7 illustrates an example schema used to assess threat detection capability of an organization based on given data sources in accordance with an embodiment of the present disclosure.

FIG. 7 an example schema outlining how the security maturity scoring module content maps to industry frameworks and customer data in accordance with an embodiment of the present disclosure. Schema 700 may allow reporting on threat detection capability of the organization based on the given data from different data sources. As shown in FIG. 7, a "dw_enrichment" table may be used when there are matches to detection rules. The "dw_enrichment" table maps a given detection rule (use case) to industry frameworks, threat categories or use cases, and different data types. Table "vsoc_id" may provide the rule name, description, and any other data enrichment that needs to be tied to specific detection rules. Table "cis_controls" enriches any mappings to the CIS Top 20 Benchmarks. In an example implementation, table "kill_chain" enriches any mappings to the Cyber Kill Chain, table "mitre_tactic" enriches any mappings to the MITRE ATT&CK Tactics, table "mitre_technique" enriches any mappings to the MITRE ATT&CK Techniques, table "dw_category enriches any mappings to different use cases or threat category, and table "data_type" defines normalized data types/categories that may be mapped to the data type of MITRE Tactics. Table "dw_sourcetype" may be used to map vendor or customer data sources to predefined data types. The table "dw_sourcetype" may also map a given data source to the expected Splunk Data Model, and table "cim_dm" may define any mappings to Splunk Data Models. Similarly, a schema may be used to map threats to different industry frameworks.

Figure 8:
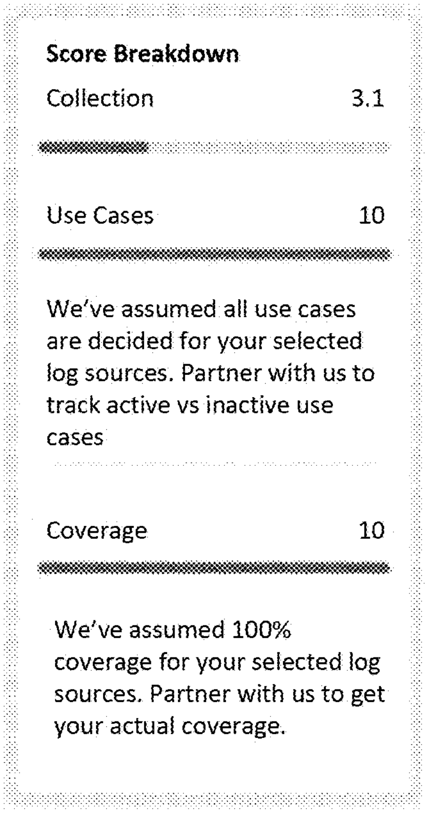
FIG. 8 is an example of maturity scores for individual attributes in accordance with an embodiment of the present disclosure.

FIG. 8 is an example of maturity scores for individual attributes in accordance with an embodiment of the present disclosure. Interface 800 shows a breakdown of compartment score for an organization as it pertains to data collection, use case coverage, and asset coverage scoring. As shown in FIG. 8, the data collection score (could be) 3.1, use cases maturity score maybe 10.0, and coverage maturity maybe 10.0 based on the assessment performed on data sources. As illustrated, if inactive security systems, data sources, and use cases are activated, the organization may achieve an ideal security maturity score. The below score breakdown illustrates the.

Figure 9:
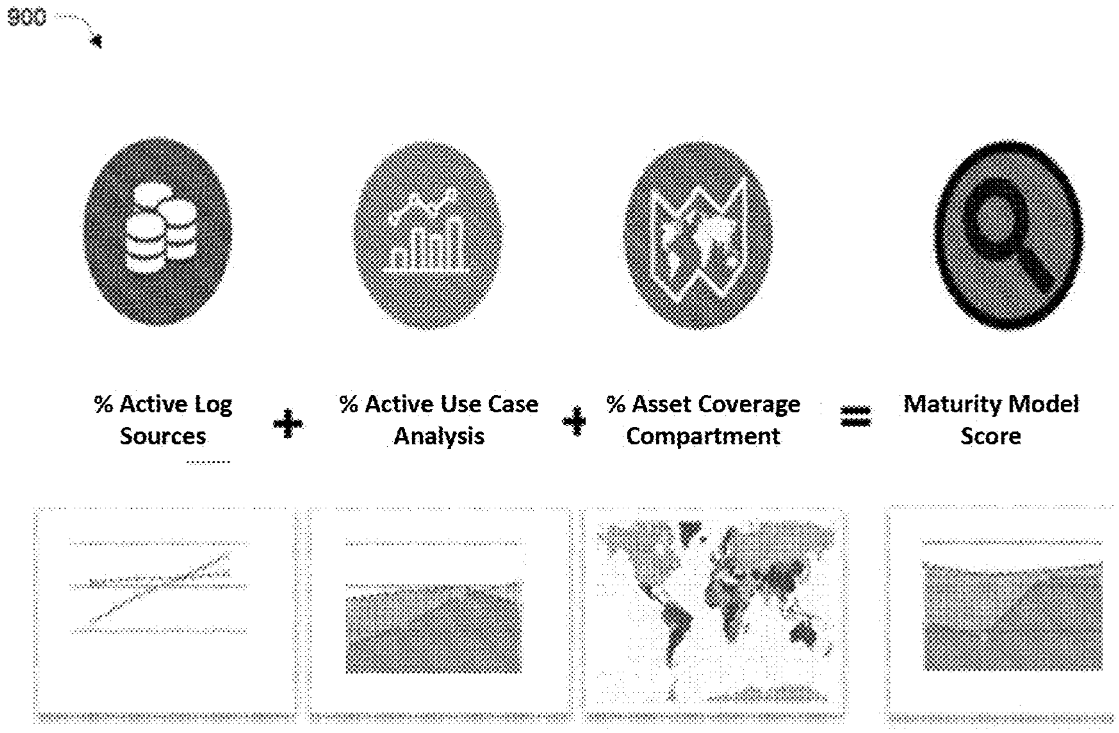
FIG. 9 is an example dashboard illustrating security maturity overview of an organization in accordance with an embodiment of the present disclosure.
Figure 10:
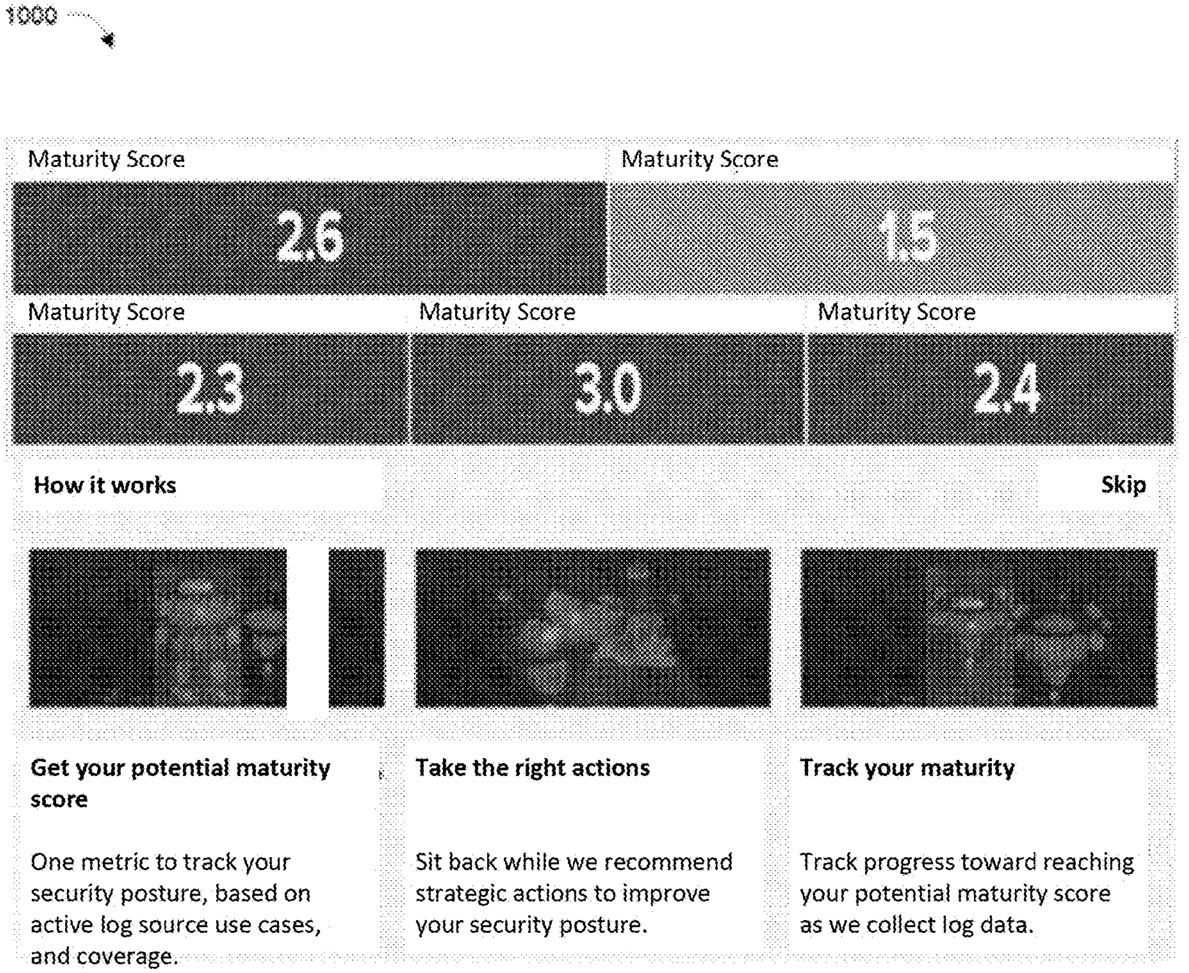
FIG. 10 is an example dashboard illustrating maturity score of the organization against each of the individual attributes in accordance with an embodiment of the present disclosure.

FIG. 9 is an example dashboard illustrating a security maturity overview of an organization in accordance with an embodiment of the present disclosure. The dashboard, as illustrated in FIG. 9 may provide a quick overview of the security preparedness of the organization. It may represent metrics such as active data source coverage, use case coverage, and how much the asset collection coverage is, and finally, what is the overall maturity score of the organization over the period of time. FIG. 10 is an example dashboard illustrating the maturity score of the organization against each of the individual attributes in accordance with an embodiment of the present disclosure. It illustrates a separate score for each assessment parameter. For example, FIG. 10 illustrates the maturity score for "high" value data sources, maturity score for "medium" value data sources, maturity score for "low" value data sources; includes maturity score for "high" value use-cases, maturity score for "medium" value use-cases and maturity score for "low" value use-cases. Similarly, for each parameter maturity score may be displayed independently.

Figure 11A:
FIG. 11A is a flow diagram illustrating assessment of security maturity in accordance with an embodiment of the present disclosure.

FIG. 11A is a flow diagram illustrating the assessment of security maturity in accordance with an embodiment of the present disclosure. A method for assessing the security maturity of an organization may include steps of receiving onboarding inputs, including a list of data sources, a list of jurisdictions where the organization may have a business interest, and a list of use cases as shown at block 1102, collecting data using custom rules from a plurality of data sources of the list of data sources as shown at block 1104, determining use case coverage by the plurality of data sources by referring to a content library as shown at block 1106, determining a criticality score for each of the plurality of data sources as shown at block 1108 based on one or more use cases covered by each of the plurality of data sources, calculating data source coverage and asset collection coverage based on the data received and the list of data sources as shown at block 1110 and determining a security maturity score of the organization using a maturity score model that is a function of above parameters as shown at block 1112. In an embodiment, the maturity score model may be a function of the data source coverage, the asset collection coverage, the use case coverage, the criticality score associated with each of the plurality of data sources, and asset coverage by each of the plurality of data sources. The method may further include steps of estimating compliance coverage of the organization based on actual compliance by IT resources of the organization located in each of the plurality of jurisdictions against respective compliance frameworks.

Figure 11B:
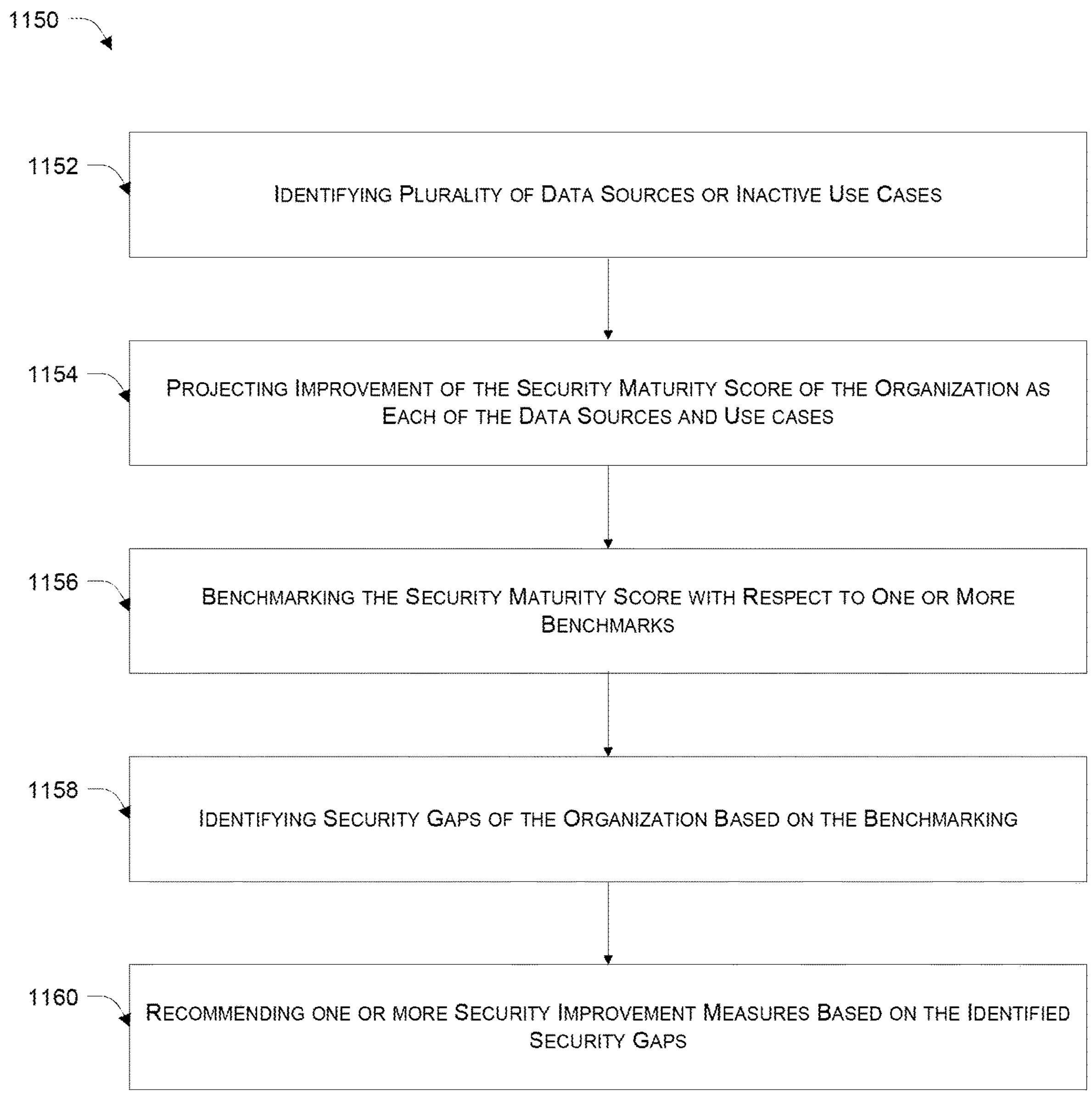
FIG. 11B is a flow diagram illustrating benchmarking of security maturity score and recommending security improvement measures in accordance with an embodiment of the present disclosure.

FIG. 11B is a flow diagram illustrating the benchmarking of security maturity score and recommending security improvement measures in accordance with an embodiment of the present disclosure. The method may further include steps of identifying a plurality of data sources or use cases of the list of data sources and use cases as shown at block 1152, projecting improvement of the security maturity score of the organization as each of the data sources and use cases are activated as shown at block 1154, benchmarking the security maturity score with respect to one or more benchmarks as shown at block 1156 identifying security gaps of the organization based on the benchmarking as shown at block 1158 and recommending one or more security improvement measures based on the identified security gaps as shown at block 1160.

Figure 12:
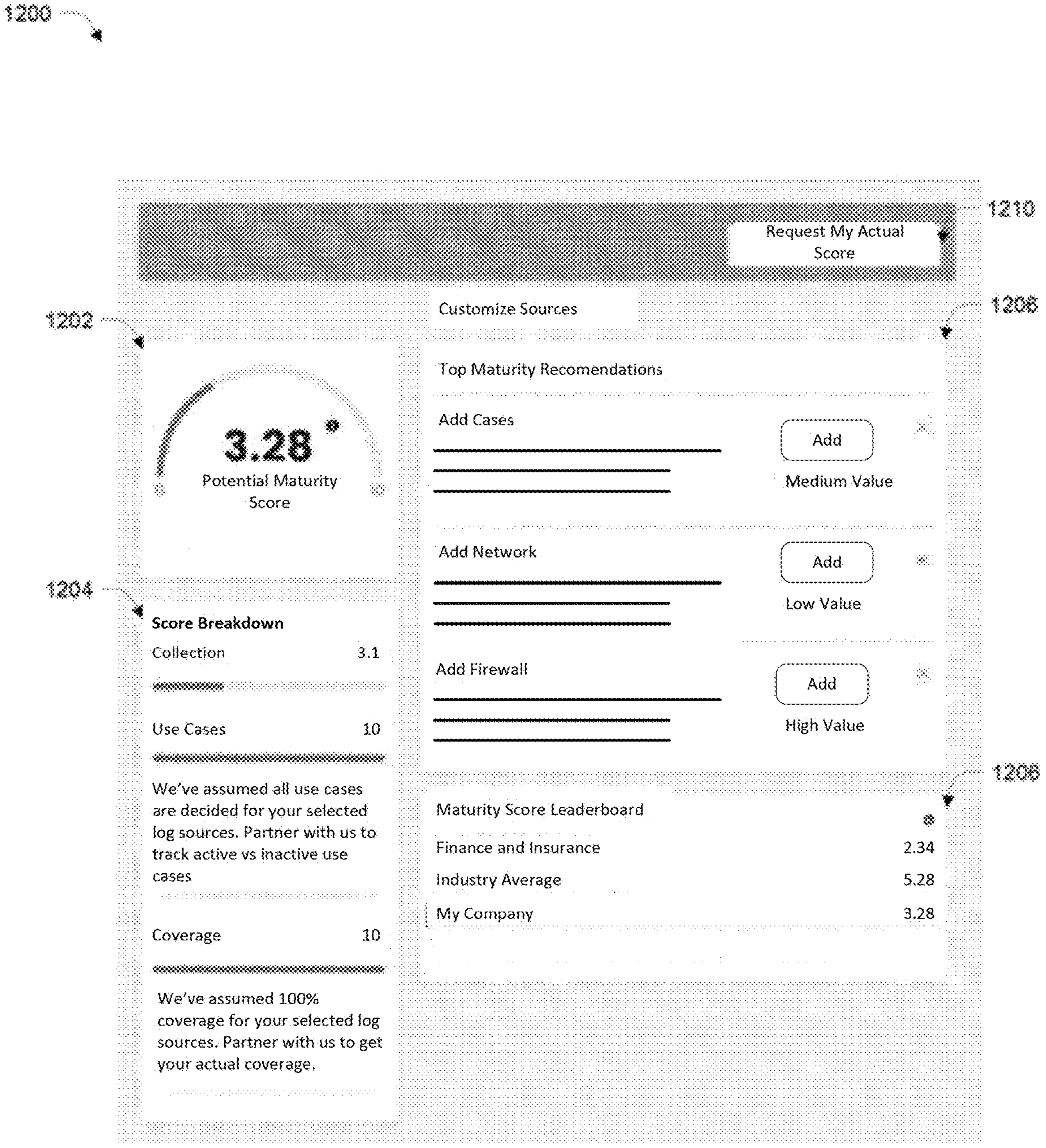
FIG. 12 is an example dashboard illustrating maturity score of the organization and maturity score against each of the individual attributes in accordance with an embodiment of the present disclosure.

FIG. 12 is an example dashboard illustrating a maturity score of the organization and maturity score against each of the individual attributes in accordance with an embodiment of the present disclosure. A user can access the dashboard 1200 to see the potential maturity score and live maturity score of an organization. The user may track the maturity score against each component through the dashboard 1200. The interface 1200 shows a potential maturity score through a metered representation 1202, wherein the potential maturity score encompasses all compartments calculations and showcases the maturity score in one centralized location. The potential maturity score 1202 showcases the actual score vs. potential score components if a customer is planning on adding data sources in the future and has not yet started actively collecting those data sources. The interface 1200 may show score breakdown 1204 for different compartments and display collection score, use cases score, and coverage score.

The system may generate security recommendation 1206, such as add CASB, add network, and add firewall and present the recommendation through the interface 1200. The recommendations 1206 demonstrates the top data source recommendations as outputs based on the maturity model and gaps in an organization's security operations visibility. The interface 1200 may present a maturity score leaderboard 1208 to show the comparative industry vertical maturity score for baselining maturity against peer organizations. The interface 1200 provides to a user to check its organization's maturity score and compare it against the industry averages. A user through interface 1200 may initiate calculation of the actual maturity score of the organization based active data sources by clicking the button 1210. Once a user has modeled all data sources for their organization, they can then "request my actual score" through the interface 1210. On click of the button 1208, the system starts collecting, storing, and analyzing the maturity score and can provide the actual score vs. the potential score through the dashboard. In an embodiment, when the actual score if received from the scoring engines, the output provided may match the collection scope for a new customer and validates their overall scope.

FIG. 13 illustrates a list of industries against which one can benchmark their security operations maturity in accordance with an embodiment of the present disclosure. FIG. 13 lists NAICS codes for Industry Selection. A user can select through an interactive user interface one or more industries and compare against baseline maturity scores of their organization against recommended maturity scores of the one or more industries.

Figure 14:
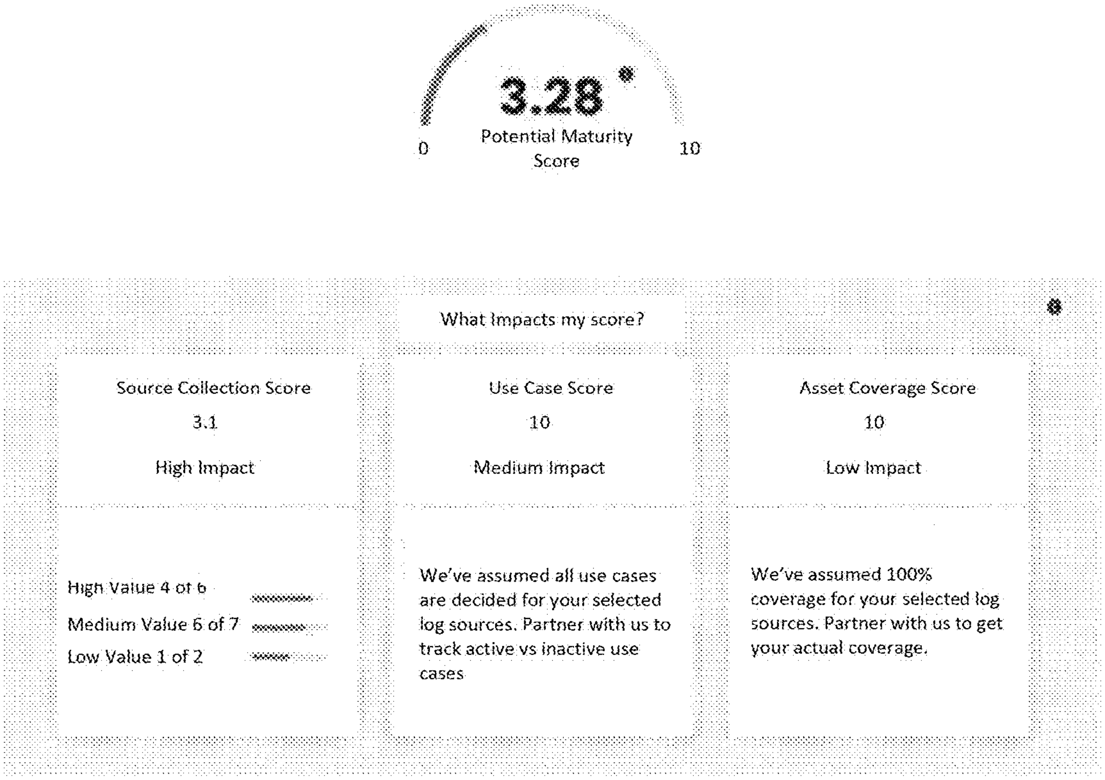
FIG. 14 illustrates an example scoring engine compartments used to assess security maturity in accordance with an embodiment of the present disclosure.

FIG. 14 illustrates an example scoring engine compartments used to assess security maturity in accordance with an embodiment of the present disclosure. As shown in FIG. 14, scoring engine compartments such as data source selection, use case coverage, and asset collection coverage are used to determine the overall maturity score of any organization. In an embodiment, the maturity score is calculated separately for each compartment. These scores represent the default data sources that the system suggests at baseline without any customizations made to the customer scoring engine and reflect a potential maturity score until these systems are actively collecting data sources. In an embodiment, the system enables customization and planning of potential data sources against the actual collection, providing a score for both actual collection and potential score if all data sources are activated.

FIG. 15 illustrates an exemplary user interface that allows customization of the data source in accordance with an embodiment of the present disclosure. The user interface 1500 allows customization of data source collection and asset coverage. Data sources can be added and removed using the user interface 1500. In an embodiment, a user can also define the criticality level of each of the data sources. The user may select a particular data source from a list of potential data sources and activate it for collection.

Figure 16:
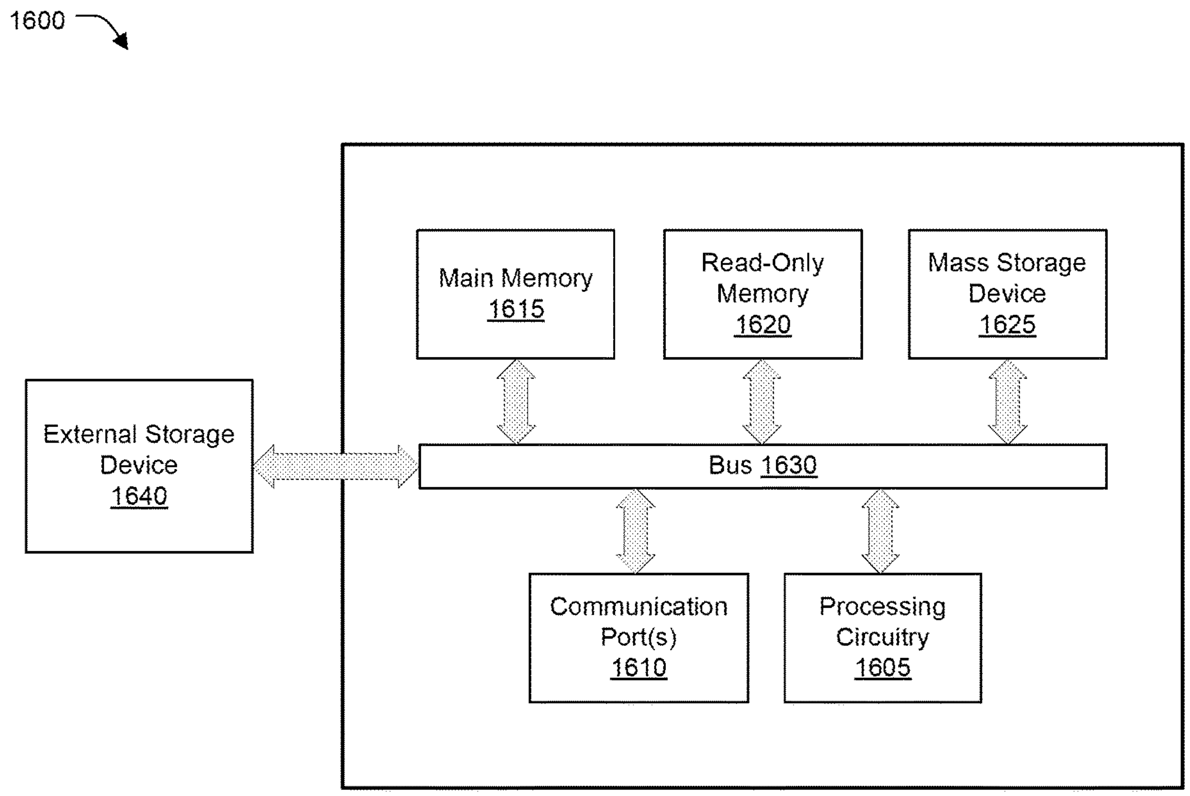
FIG. 16 illustrates an exemplary computer system in which or with which embodiments of the present invention may be utilized.

FIG. 16 illustrates an exemplary computer system in which or with which embodiments of the present invention may be utilized. Depending upon the particular implementation, the various process and decision blocks described above may be performed by hardware components, embodied in machine-executable instructions, which may be used to cause a general-purpose or special-purpose processor programmed with the instructions to perform the steps, or the steps may be performed by a combination of hardware, software, firmware and/or involvement of human participation/interaction. As shown in FIG. 16, the computer system includes an external storage device 1610, bus 1620, main memory 1630, read-only memory 1640, mass storage device 1650, communication port 1660, and processor 1670.

Those skilled in the art will appreciate computer system 1600 may include more than one processing circuitry 1670 and communication ports 1660. Processing circuitry 1670 should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quadcore, Hexa-core, or any suitable number of cores) or supercomputer. In some embodiments, processing circuitry 1670 is distributed across multiple separate processors or processing units, for example, multiple of the same type of processing units (e.g., two Intel Core i7 processors) or multiple different processors (e.g., an Intel Core i5 processor and an Intel Core i7 processor). Examples of processing circuitry 1670 include, but are not limited to, an Intel® Itanium® or Itanium 2 processor(s), or AMD® Opteron® or Athlon MP® processor(s), Motorola® lines of processors, System on Chip (SoC) processors or other future processors. Processing circuitry 1670 may include various modules associated with embodiments of the present invention.

Communication port 1660 may include a cable modem, integrated services digital network (ISDN) modem, a digital subscriber line (DSL) modem, a telephone modem, an Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of electronic devices or communication of electronic devices in locations remote from each other. Communication port 1660 can be any of an RS-232 port for use with a modem-based dialup connection, a 10/100 Ethernet port, a Gigabit or 10 Gigabit port using copper or fiber, a serial port, a parallel port, or other existing or future ports. Communication port 1660 may be chosen depending on a network, such a Local Area Network (LAN), Wide Area Network (WAN), or any network to which the computer system connects.

Memory 1630 may include Random Access Memory (RAM) or any other dynamic storage device commonly known in the art. Read-only memory 1640 can be any static storage device(s), e.g., but not limited to, a Programmable Read-Only Memory (PROM) chip for storing static information, e.g., start-up or BIOS instructions for processing circuitry 1670.

Mass storage 1650 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) 10 recorders, BLU-RAY 3D disc recorders, digital video recorders (DVRs, sometimes called a personal video recorder or PVRs), solid-state devices, quantum storage devices, gaming consoles, gaming media, or any other suitable fixed or removable storage devices, and/or any combination of the same. The non-volatile memory may also be used (e.g., to launch a boot-up routine and other instructions). Cloud-based storage may be used to supplement storage memory in 1630. Memory 1650 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firmware interfaces), e.g., those available from Seagate (e.g., the Seagate Barracuda 7200 family) or Hitachi (e.g., the Hitachi Deskstar 7K1000), one or more optical discs, Redundant Array of Independent Disks (RAID) storage, e.g., an array of disks (e.g., SATA arrays), available from various vendors including Dot Hill Systems Corp., LaCie, Nexsan Technologies, Inc. and Enhance Technology, Inc.

Bus 1620 communicatively couples processor(s) 1670 with the other memory, storage, and communication blocks. Bus 1620 can be, e.g., a Peripheral Component Interconnect (PCI)/PCI Extended (PCI-X) bus, Small Computer System Interface (SCSI), USB, or the like, for connecting expansion cards, drives, and other subsystems as well as other buses, such a front side bus (FSB), which connects processor 1670 to a software system.

Optionally, operator and administrative interfaces, e.g., a display, keyboard, and a cursor control device, may also be coupled to bus 1620 to support direct operator interaction with computer systems. Other operator and administrative interfaces can be provided through network connections connected through communication port 1660. An external storage device 1210 can be any kind of external hard-drives, floppy drives, IOMEGA® Zip Drives, Compact Disc-Read-Only Memory (CD-ROM), Compact Disc-Rewritable (CD-RW), Digital Video Disk-Read Only Memory (DVD-ROM). The components described above are meant only to exemplify various possibilities. In no way should the aforementioned exemplary computer system limit the scope of the present disclosure.

The computer system 1600 may be accessed through a user interface. The user interface application may be implemented using any suitable architecture. For example, it may be a stand-alone application wholly implemented on the computer system 1600. The user interfaces application and/or any instructions for performing any of the embodiments discussed herein may be encoded on computer-readable media. Computer-readable media includes any media capable of storing data. In some embodiments, the user interface application is a client server-based application. Data for use by a thick or thin client implemented on an electronic device computer system 1600 is retrieved on-demand by issuing requests to a server remote to the computer system 1600. For example, computer device 1600 may receive inputs from the user via an input interface and transmit those inputs to the remote server for processing and generating the corresponding outputs. The generated output is then transmitted to the computer device 1600 for presentation to the user.

While embodiments of the present invention have been illustrated and described, it will be clear that the invention is not limited to these embodiments only. Numerous modifications, changes, variations, substitutions, and equivalents will be apparent to those skilled in the art without departing from the spirit and scope of the invention, as described in the claims.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular name.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary devices.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions, or examples, which are included to enable a person having ordinary skill in the art to make and use the invention when combined with information and knowledge available to the person having ordinary skill in the art.

The foregoing description of embodiments is provided to enable any person skilled in the art to make and use the subject matter. Various modifications to these embodiments will be readily apparent to those skilled in the art, and the novel principles and subject matter disclosed herein may be applied to other embodiments without the use of the innovative faculty. The claimed subject matter set forth in the claims is not intended to be limited to the embodiments shown herein but is to be accorded to the widest score consistent with the principles and novel features disclosed herein. It is contemplated that additional embodiments are within the spirit and true scope of the disclosed subject matter.

What is claimed is:

1. A non-transitory processor-readable medium storing code representing instructions to be executed by a processor, the code comprising code to cause the processor to perform the following network cyber security operations:

monitor network traffic of network security devices of a network of an organization;

identify, based on the network traffic, a data source associated with a network security device;

identify, based on whether data is currently collected from the data source, that the data source is an inactive data source;

identify, based on the network traffic and data collected from the data sources, a plurality of active data sources;

determine, based on a number of a set of cyber security use cases covered by the plurality of active data sources associated with an organization and a number of a plurality of cyber security use cases, a cyber security use case coverage value;

determine, for each of one or more of the active data sources of the plurality of active data sources, using a machine learning model and based on a subset of cyber security use cases covered by the active data source, a criticality score for the active data source;

determine, based on a number of the plurality of active data sources and a number of the plurality of data sources, a data source coverage value;

determine, based on a number of a set of jurisdictions with which the plurality of active data sources are associated and a number of a plurality of jurisdictions associated with the organization, an asset collection coverage value;

determine, based on the cyber security use case coverage value, the criticality scores for one or more of the active data source of the plurality of active data sources, the data source coverage value, the asset collection coverage value, a security operation maturity score for the organization;

determine that the security operation maturity score does not satisfy a benchmark maturity score;

determine a security gap of the organization associated with the inactive data source; and provide, based on identification of the security gap and the determination that the security operation maturity score does not satisfy the benchmark maturity score, output for activation of the inactive data source to improve detection or prevention of cyber threats.

2. The non-transitory processor-readable medium of claim 1, the code further comprising code to cause the processor to:

receive input from a user to identify a plurality of data sources that include the plurality of active data sources.

3. The non-transitory processor-readable medium of claim 1, the code further comprising code to cause the processor to:

identify, based on analysis of network traffic of the organization, a plurality of data sources that include the plurality of active data sources.

4. The non-transitory processor-readable medium of claim 1, the code further comprising code to cause the processor to:

determine, based on the set of cyber security use cases covered by the plurality of active data sources and a plurality of compliance frameworks, compliance coverage of the organization, the security operation maturity score being further based on the compliance coverage.

5. The non-transitory processor-readable medium of claim 1, the code further comprising code to cause the processor to provide, based on the security operation maturity score and one or more benchmarks, a recommendation regarding the security operation maturity score of the organization, wherein:

the one or more benchmarks include a benchmark security maturity score based on the plurality of active data sources.

6. The non-transitory processor-readable medium of claim 5, wherein:

the one or more benchmarks include at least one of (1) a security maturity score of an organization similar to the organization, (2) a security maturity score of an industry related to the organization, (3) a security operation maturity score of a state, or (4) a security operation maturity score of a nation.

7. The non-transitory processor-readable medium of claim 1, the code further comprising code to cause the processor to:

identify at least one missing cyber security use case not covered by the plurality of active data sources.

8. The non-transitory processor-readable medium of claim 5, the code further comprising code to cause the processor to:

identify, based on the set of cyber security use cases covered by the plurality of active data sources and the one or more benchmarks, security gaps of the organization.

9. The non-transitory processor-readable medium of claim 1, wherein determining the criticality score for an active data source of the plurality of active data sources comprises using a weighted criticality score based on a score of each cyber security use case covered by that active data source.

10. The non-transitory processor-readable medium of claim 1, wherein the determining of the cyber security use case coverage value is based on data received in real-time from each active data source from the plurality of active data sources.

11. The non-transitory processor-readable medium of claim 1, wherein determining the criticality score for an active data source is based on at least one of (1) whether the active data source includes external authentication capabilities or (2) a direction of network traffic of that active data source.

12. The non-transitory processor-readable medium of claim 1, wherein determining the security operation maturity score includes code to calculate the security operation maturity score for the organization comprising employing a security maturity model that comprises a logistic equation that employs inputs comprising the cyber security use case coverage value, the criticality scores for one or more of the active data source of the plurality of active data sources, the data source coverage value, and the asset collection coverage value.

13. The non-transitory processor-readable medium of claim 1, wherein:

the security operation maturity score for the organization includes an overall security operation maturity score based on a plurality of security operation maturity scores, each security operation maturity scores from the plurality of security operation maturity scores indicating a security operation maturity level of a segment from a plurality of segments of information technology infrastructure of the organization, and the plurality of security operation maturity scores including at least one of a security operation maturity score of data centers, a security operation maturity score of cloud service providers, or a security operation maturity score of software as a service (SaaS).

14. The non-transitory processor-readable medium of claim 1, wherein:

the security operation maturity score for the organization is determined based on a plurality of security operation maturity scores, each security operation maturity score of the plurality of security operation maturity scores associated with at least one of a cyber security use case from the plurality of cyber security use cases or an active data source from the plurality of active data sources.

15. The non-transitory processor-readable medium of claim 5, the code further comprising code to cause the processor to:

generate based on the one or more benchmarks, a prediction of improvement of the security operation maturity score of the organization as each data source from a plurality of inactive data sources is activated to be an active data source, wherein a recommendation to improve the security operation maturity score of the organization comprises the prediction of improvement of the security operation maturity score of the organization.

16. The non-transitory processor-readable medium of claim 15, wherein the recommendation to improve the security operation maturity score of the organization comprises an indication of the security operation maturity score of the organization.

17. A method for network cyber security, comprising:

monitoring network traffic of network security devices of a network of an organization;

identifying, based on the network traffic, a data source associated with a network security device;

identifying, based on whether data is currently collected from the data source, that the data source is an inactive data source;

identifying, based on the network traffic and data collected from the data sources, a plurality of active data sources;

determining, based on a number of a set of cyber security use cases covered by the plurality of active data sources associated with an organization and a number of a plurality of cyber security use cases, a cyber security use case coverage value;

determining, for each of one or more of the active data sources of the plurality of active data sources, using a machine learning model and based on a subset of cyber security use cases covered by the active data source, a criticality score for the active data source;

determining, based on a number of the plurality of active data sources and a number of the plurality of data sources, a data source coverage value;

determining, based on a number of a set of jurisdictions with which the plurality of active data sources are associated and a number of a plurality of jurisdictions associated with the organization, an asset collection coverage value;

determining, based on the cyber security use case coverage value, the criticality scores for one or more of the active data source of the plurality of active data sources, the data source coverage value, the asset collection coverage value, a security operation maturity score for the organization;

determining that the security operation maturity score does not satisfy a benchmark maturity score;

determining a security gap of the organization associated with the inactive data source; and providing, based on identification of the security gap and the determination that the security operation maturity score does not satisfy the benchmark maturity score, output for activation of the inactive data source to improve detection or prevention of cyber threats.

18. An apparatus, comprising:

a memory; and a processor operatively coupled to the memory, the processor configured to perform the following network cyber security operations;

monitor network traffic of network security devices of a network of an organization;

identify, based on the network traffic, a data source associated with a network security device;

identify, based on whether data is currently collected from the data source, that the data source is an inactive data source;

identify, based on the network traffic and data collected from the data sources, a plurality of active data sources;

determine, based on a number of a set of cyber security use cases covered by the plurality of active data sources associated with an organization and a number of a plurality of cyber security use cases, a cyber security use case coverage value;

determine, for each of one or more of the active data sources of the plurality of active data sources, using a machine learning model and based on a subset of cyber security use cases covered by the active data source, a criticality score for the active data source;

determine, based on a number of the plurality of active data sources and a number of the plurality of data sources, a data source coverage value;

determine, based on a number of a set of jurisdictions with which the plurality of active data sources are associated and a number of a plurality of jurisdictions associated with the organization, an asset collection coverage value;

determine, based on the cyber security use case coverage value, the criticality scores for one or more of the active data source of the plurality of active data sources, the data source coverage value, the asset collection coverage value, a security operation maturity score for the organization, determine that the security operation maturity score does not satisfy a benchmark maturity score;

determine a security gap of the organization associated with the inactive data source; and provide, based on identification of the security gap and the determination that the security operation maturity score does not satisfy the benchmark maturity score, output for activation of the inactive data source to improve detection or prevention of cyber threats.

* * * * *